(12) United States Patent
Akiyama

(10) Patent No.: US 11,467,481 B2
(45) Date of Patent: Oct. 11, 2022

(54) LIGHT SOURCE DEVICE AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/483,224

(22) Filed: Sep. 23, 2021

(65) Prior Publication Data
US 2022/0091496 A1 Mar. 24, 2022

(30) Foreign Application Priority Data
Sep. 24, 2020 (JP) .............................. JP2020-159557

(51) Int. Cl.
| | |
|---|---|
| G03B 21/20 | (2006.01) |
| G02F 1/1335 | (2006.01) |
| G03B 33/12 | (2006.01) |
| G02B 27/28 | (2006.01) |
| G02B 5/30 | (2006.01) |
| G03B 21/00 | (2006.01) |

(52) U.S. Cl.
CPC ........... G03B 33/12 (2013.01); G03B 21/006 (2013.01); G03B 21/204 (2013.01); G03B 21/208 (2013.01); G03B 21/2066 (2013.01); G03B 21/2073 (2013.01)

(58) Field of Classification Search
CPC .. G03B 21/204; G03B 33/12; G03B 21/2066; G03B 21/2073; G03B 21/208; G02B 27/283

USPC .......................................................... 353/20
See application file for complete search history.

(56) References Cited

U.S. PATENT DOCUMENTS

| | | | |
|---|---|---|---|
| 5,161,042 | A | 11/1992 | Hamada |
| 10,444,611 | B2* | 10/2019 | Pan ....................... G03B 21/204 |
| 10,915,014 | B1 | 2/2021 | Akiyama |
| 2005/0248736 | A1 | 11/2005 | Itoh |
| 2008/0062386 | A1 | 3/2008 | Ito |
| 2013/0027670 | A1 | 1/2013 | Akiyama et al. |
| 2020/0201155 | A1 | 6/2020 | Akiyama |
| 2020/0249555 | A1 | 8/2020 | Akiyama |

(Continued)

FOREIGN PATENT DOCUMENTS

| | | |
|---|---|---|
| JP | H04-060538 A | 2/1992 |
| JP | 2005-321502 A | 11/2005 |
| JP | 2008-065250 A | 3/2008 |

(Continued)

Primary Examiner — Jerry L Brooks
(74) Attorney, Agent, or Firm — Oliff PLC

(57) ABSTRACT

A light source device according to the present disclosure includes a light source section for emitting first light, a first polarization split element for performing polarization split on the first light, a second polarization split element for reflecting the first light polarized in a first polarization direction and transmitting the first light polarized in a second polarization direction, a diffusion element for diffusing the first light from the first polarization split element, a wavelength conversion element for performing wavelength conversion on the first light entering the wavelength conversion element from the second polarization split element to emit second light, and an optical element having a flat-surface area and the concave-surface area.

15 Claims, 12 Drawing Sheets

(56) References Cited

U.S. PATENT DOCUMENTS

2020/0252589 A1    8/2020   Akiyama
2020/0314397 A1   10/2020   Akiyama

FOREIGN PATENT DOCUMENTS

| | | |
|---|---|---|
| JP | 2013-167812 A | 8/2013 |
| JP | 2014-106453 A | 6/2014 |
| JP | 2014-182206 A | 9/2014 |
| JP | 2015-060035 A | 3/2015 |
| JP | 2019-053241 A | 4/2019 |
| JP | 2020-034821 A | 3/2020 |
| JP | 2020-101711 A | 7/2020 |
| JP | 2020-106692 A | 7/2020 |
| JP | 2020-126089 A | 8/2020 |
| JP | 2020-126170 A | 8/2020 |
| JP | 2020-160236 A | 10/2020 |
| JP | 2021-033165 A | 3/2021 |

\* cited by examiner

LIGHT SOURCE DEVICE AND PROJECTOR

The present application is based on, and claims priority from JP Application Serial Number 2020-159557, filed Sep. 24, 2020, the disclosure of which is hereby incorporated by reference herein in its entirety.

BACKGROUND

1. Technical Field

The present disclosure relates to a light source device and a projector.

2. Related Art

There has been known a projector which modulates light emitted from a light source to generate image light based on image information, and then projects the image light thus generated. In JP-A-4-60538 (Document 1), there is disclosed a projection type color image display device provided with a light source, a plurality of dichroic mirrors, a liquid crystal display element having a microlens array, and a projection lens. The projection type color image display device separates the white light emitted from the light source into a plurality of colored light beams having respective colors different from each other, and then makes the colored light beams thus separated from each other enter the respective sub-pixels different from each other in one liquid crystal display element to thereby perform color display.

In the projection type color image display device described above, there are arranged a red reflecting dichroic mirror, a green reflecting dichroic mirror, and a blue reflecting dichroic mirror along the incident light axis of the white light emitted from the light source in a state of being nonparallel to each other. The white light emitted from the light source passes through the dichroic mirrors described above to thereby be separated into red light, green light, and blue light different in proceeding direction from each other. The red light, the green light, and the blue light respectively enter red sub-pixels, green sub-pixels, and blue sub-pixels of the light modulation element in the state of being spatially separated from each other by a microlens disposed at the incidence side of the light modulation element.

In the projection type color image display device in Document 1, a lamp light source such as a halogen lamp or a xenon lamp is adopted as the white light source, and a liquid crystal display element is adopted as the light modulation element. Although the light emitted from the lamp light source is unpolarized light, when using the liquid crystal display element as the light modulation element, the light entering the liquid crystal display element needs to be linearly polarized light having a specific polarization direction. To this end, it is conceivable to dispose a pair of multi-lens arrays for dividing the incident light into a plurality of partial light beams, and a polarization conversion element for uniform the polarization directions of the plurality of partial light beams between the white light source and the liquid crystal display element as a device for homogenously illuminating the liquid crystal display element. In this case, there is often used a polarization conversion element provided with a plurality of polarization split layers and a plurality of reflecting layers alternately arranged along a direction crossing the incident direction of the light, and a retardation layer disposed in a light path of the light transmitted through the polarization split layers or a light path of the light reflected by the reflecting layers.

However, when reducing the projection type color image display device described above in size in compliance with the recent demand of reduction in size, it is difficult to manufacture the polarization conversion element narrow in pitch between the polarization split layer and the reflecting layer. Therefore, it is difficult to reduce the size of the light source device equipped with this type of polarization conversion element, and by extension, to reduce the size of the projector equipped with the light source device. In view of such a problem, it is required to provide a light source device capable of emitting a plurality of colored light beams uniformed in polarization direction without using the polarization conversion element narrow in pitch.

SUMMARY

In view of the problems described above, according to an aspect of the present disclosure, there is provided a light source device including a light source section configured to emit a first light beam which has a first wavelength band and includes light polarized in a first polarization direction and light polarized in a second polarization direction different from the first polarization direction, a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction, a second polarization split element disposed at the first direction side of the first polarization split element, and configured to reflect the first light beam which enters the second polarization split element along the first direction from the first polarization split element, and is polarized in the first polarization direction toward the second direction, a diffusion element disposed at the second direction side of the first polarization split element, and configured to diffuse the first light beam which enters the diffusion element along the second direction from the first polarization split element, and is polarized in the second polarization direction, and configured to emit the first light beam diffused toward a third direction as an opposite direction to the second direction, a wavelength conversion element disposed at the second direction side of the second polarization split element, configured to perform wavelength conversion on the first light beam which enters the wavelength conversion element along the second direction from the second polarization split element, and is polarized in the first polarization direction, and configured to emit a second light beam having a second wavelength band different from the first wavelength band toward the third direction, and an optical element disposed between the first polarization split element and the second polarization split element, and having a flat-surface area and a concave-surface area, wherein the second light beam enters the second polarization split element along the third direction from the wavelength conversion element, the second polarization split element transmits the second light beam polarized in the first polarization direction toward the third direction, and reflects the second light beam polarized in the second polarization direction toward a fourth direction as an opposite direction to the first direction, the optical element separates the second light beam which enters the optical element along the fourth direction from the second polarization split element and is polarized in the second polarization direction into a third light beam having a third wavelength band different from the second wavelength band, and a fourth light beam having a fourth wavelength band different from the second wavelength band and the third wavelength band to transmit the third light beam toward the fourth direction and reflect the fourth light beam toward the first direction, and the first polarization split element transmits the first light beam which is emitted along the third direction from the diffusion element, and reflects the third light beam which enters the first polarization split element along the fourth direction from the second polarization split element toward the third direction.

According to an aspect of the present disclosure, there is provided a projector including the light source device according to the aspect of the present disclosure, a light modulation device configured to modulate light from the light source device in accordance with image information, and a projection optical device configured to project the light modulated by the light modulation device.

DESCRIPTION OF EXEMPLARY EMBODIMENTS

First Embodiment

A first embodiment of the present disclosure will hereinafter be described using FIG. 1 through FIG. 15.

Figure 1:
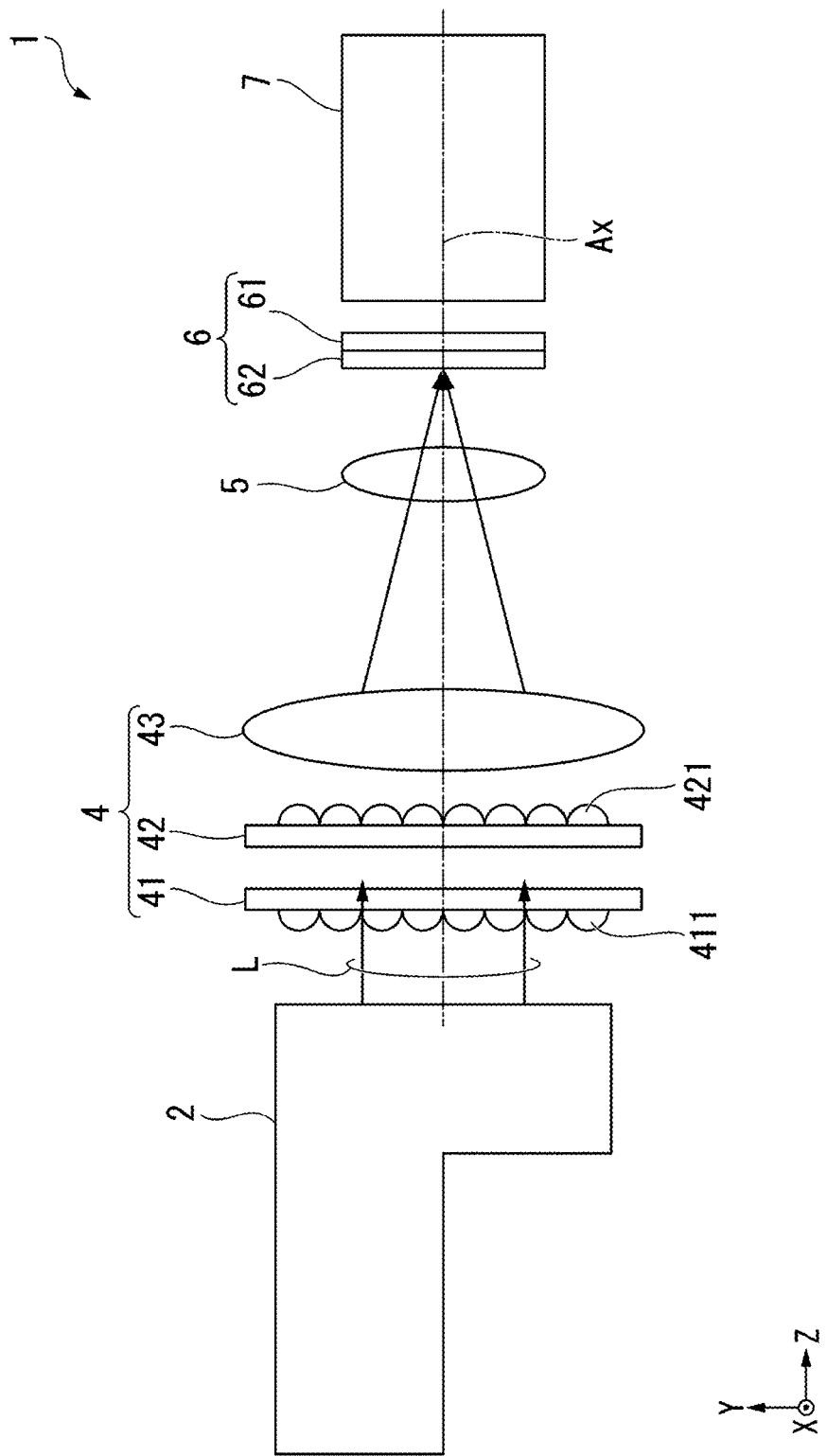
FIG. 1 is a schematic configuration diagram of a projector according to a first embodiment.

FIG. 1 is a schematic configuration diagram of a projector 1 according to the present embodiment.

It should be noted that in each of the drawings described below, the constituents are shown with the scale ratios of respective sizes set differently between the constituents in some cases in order to make each of the constituents eye-friendly.

The projector 1 according to the present embodiment modulates the light emitted from a light source device 2 to form an image corresponding to image information, and then projects the image thus formed on a projection target surface such as a screen in an enlarged manner. In other words, the projector 1 modulates the light emitted from the light source device 2 with a single light modulation device 6 including a single liquid crystal panel 61 to thereby form the image, and then projects the image thus formed. The projector 1 is a so-called single-panel projector.

As shown in FIG. 1, the projector 1 is provided with a light source device 2, a homogenization device 4, a field lens 5, a light modulation device 6, and a projection optical device 7. The light source device 2, the homogenization device 4, the field lens 5, the light modulation device 6, and the projection optical device 7 are disposed at predetermined positions along an illumination light axis Ax. The illumination light axis Ax is defined as an axis along the proceeding direction of the principal ray of the light L emitted from the light source 2.

The configuration of the light source device 2 and the homogenization device 4 will be described later in detail.

The field lens 5 is disposed between the homogenization device 4 and the light modulation device 6. The field lens 5 collimates the light L emitted from the homogenization device 4, and then guides the result to the light modulation device 6.

The projection optical device 7 projects the light modulated by the light modulation device 6, namely the light forming the image, on the projection target surface (not shown) such as a screen. The projection optical device 7 has a single projection lens or a plurality of projection lenses.

In the following description, the axis parallel to the proceeding direction of the light emitted from the light source device 2 along the illumination light axis Ax is defined as a Z axis, and the proceeding direction of the light is defined as a +Z direction. Further, two axes each perpendicular to the Z axis, and perpendicular to each other are defined as an X axis and a Y axis. Out of the directions along these axes, an upper side in the vertical direction in the space in which the projector 1 is installed is defined as a +Y direction. Further, the right side in the horizontal direction when viewing an object which the light enters along the +Z direction so that the +Y direction points the upper side in the vertical direction is defined as a +X direction. Although not shown in the drawings, an opposite direction to the +X direction is defined as a −X direction, an opposite direction to the +Y direction is defined as a −Y direction, and an opposite direction to the +Z direction is defined as a −Z direction.

The +X direction in the present embodiment corresponds to a first direction in the appended claims, and the −Z direction in the present embodiment corresponds to a second direction in the appended claims. Further, the +Z direction in the present embodiment corresponds to a third direction in the appended claims, and the −X direction in the present embodiment corresponds to a fourth direction in the appended claims.

Configuration of Light Source Device

Figure 2:
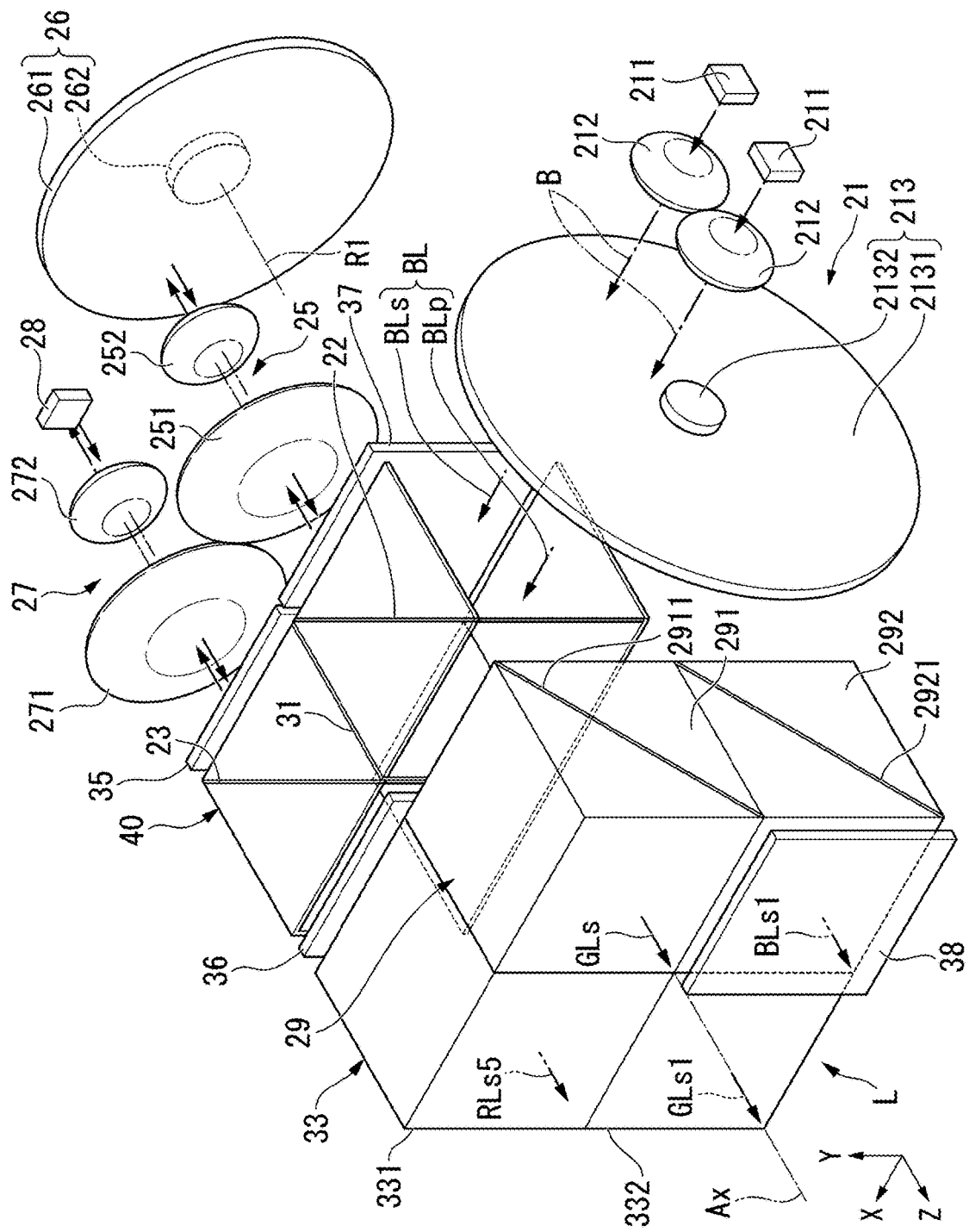
FIG. 2 is a perspective view of a light source device according to the first embodiment.
Figure 3:
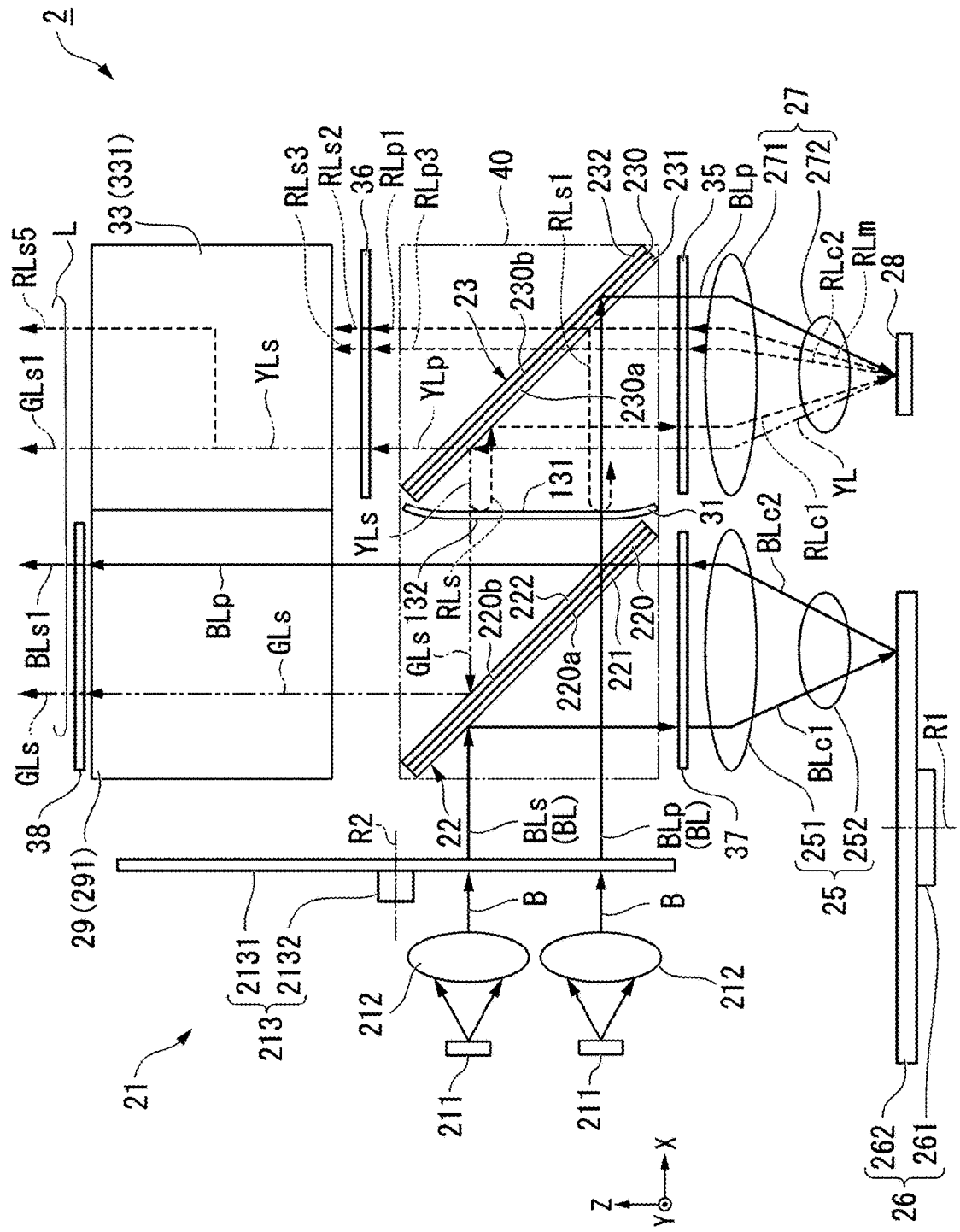
FIG. 3 is a plan view of the light source device viewed from a +Y direction.

FIG. 2 is a perspective view of the light source device 2 according to the present embodiment. FIG. 3 is a plan view of the light source device 2 viewed from the +Y direction.

As shown in FIG. 2 and FIG. 3, the light source device 2 emits the light L for illuminating the light modulation device 6 toward a direction parallel to the illumination light axis Ax, namely the +Z direction. The light L emitted by the light source device 2 includes a plurality of colored light beams which are linearly polarized light beams having a uniform polarization direction, and are spatially separated from each other. In the present embodiment, the light L emitted by the light source device 2 consists of four light beams each formed of P-polarized light. The four light beams correspond to a green light beam GLs, a blue light beam BLs1, a red light beam RLs5, and a green light beam GLs1.

The light source device 2 has a light source section 21, a first optical member 22, a second optical member 23, a first light collection element 25, a diffusion device 26, a second light collection element 27, a wavelength conversion element 28, a first color separation element 29, a second color separation element 33, an optical element 31, a first retardation element 37, a third retardation element 35, a fourth retardation element 36, a fifth retardation element 38, and a light tunnel 40.

It should be noted that a P-polarization component in the present embodiment corresponds to light polarized in a first polarization direction in the appended claims, and an S-polarization component corresponds to light polarized in a second polarization direction in the appended claims. Further, as described later, the first optical member 22 and the second optical member 23 are different in orientation of a film for separating the polarization components or the colored light beams from the first color separation element 29 and the second color separation element 33. Therefore, the descriptions of P-polarization component and S-polarization component represent the polarization direction with respect to the first optical member 22 and the second optical member 23, and are reversed in the polarization direction with respect to the first color separation element 29 and the second color separation element 33. Specifically, the P-polarization component with respect to the first optical member 22 and the second optical member 23 corresponds to the S-polarization component with respect to the first color separation element and the second color separation element 33, and the S-polarization component with respect to the first optical member 22 and the second optical member 23 corresponds to the P-polarization component with respect to the first color separation element 29 and the second color separation element 33. It should be noted that in order to prevent confusion in the explanation, the P-polarization component and the S-polarization component are described as the polarization directions with respect to the first optical member 22 and the second optical member 23.

Configuration of Light Source Section

The light source section 21 emits the blue light beam BLs which enters the first optical member 22 along the +X direction. The light source section 21 has a plurality of light emitting elements 211, a plurality of collimator lenses 212, and a rotary retardation device 213. The light emitting elements 211 are each formed of a solid-state light source for emitting a blue light beam B. Specifically, the light emitting elements 211 are each formed of a semiconductor laser for emitting the blue light beam B as S-polarized light. The blue light beam B is a laser beam having a blue wavelength band of, for example, 440 through 480 nm, and having a peak wavelength within a range of, for example, 450 through 460 nm. In other words, the light emitting elements 211 each emit the blue light beam B having the blue wavelength band. In the present embodiment, the blue light beam B having the blue wavelength band corresponds to light in a first wavelength band in the appended claims.

In the case of the present embodiment, the plurality of light emitting elements 211 is arranged along the Z axis.

Although the light source section 21 in the present embodiment has two light emitting elements 211, the number of the light emitting elements 211 is not limited, and the number of the light emitting elements 211 can be one. Further, the arrangement of the plurality of light emitting elements 211 is not limited as well. Further, the light emitting elements 211 are arranged so as to emit the blue light beams B as the S-polarization component, but can be arranged so as to emit the blue light beams as the P-polarization component since a light intensity ratio between the S-polarized light and the P-polarized light can arbitrarily be set by the rotary retardation device 213. In other words, it is possible for the light emitting elements 211 to rotate as much as 90° centering on the emission optical axis.

The plurality of collimator lenses 212 is disposed between the plurality of light emitting elements 211 and the rotary retardation device 213. The collimator lenses 212 are disposed so as to correspond one-to-one to the light emitting elements 211. The collimator lens 212 collimates the light emitted from the light emitting element 211.

The rotary retardation device 213 has a second retardation element 2131, and a rotation device 2132. The second retardation element 2131 is made rotatable centering on a rotational axis along a proceeding direction of the light entering the second retardation element 2131, namely a rotational axis R2 parallel to the X axis. The rotation device 2132 is formed of a motor and so on, and rotates the second retardation element 2131.

The second retardation element 2131 is formed of a ½ wave plate or a ¼ wave plate with respect to the blue wavelength band. A part of the blue light beam B as the S-polarization component having entered the second retardation element 2131 is converted into a blue light beam BLp as the P-polarization component by the second retardation element 2131. Therefore, the blue light beam B having been transmitted through the second retardation element 2131 turns to light in which the blue light beam BLs as the S-polarization component and the blue light beam BLp as the P-polarization component mixed with each other with a predetermined ratio. Specifically, the blue light beams B emitted from the light emitting elements 211 enter the second retardation element 2131, and the second retardation element 2131 emits a first light beam BL including the blue light beam BLs as the S-polarization component and the blue light beam BLp as the P-polarization component.

By the rotation device 2132 adjusting the rotational angle of the second retardation element 2131, the ratio between the light intensity of the blue light beam BLs as the S-polarization component included in the light beam having been transmitted through the second retardation element 2131 and the light intensity of the blue light beam BLp as the P-polarization component included in the light beam having been transmitted through the second retardation element 2131 is adjusted. It should be noted that when there is no need to adjust the ratio between the light intensity of the blue light beam BLs and the light intensity of the blue light beam BLp, the rotation device 2132 for rotating the second retardation element 2131 is not required to be disposed. In that case, the rotational angle of the second retardation element 2131 is set so that the ratio between the light intensity of the blue light beam BLs and the light intensity of the blue light beam BLp becomes a predetermined light intensity ratio, and then the rotational position of the second retardation element 2131 is fixed.

In such a manner, the light source section 21 in the present embodiment emits a first light beam BL having the blue wavelength band and including the blue light beam BLs as the S-polarization component and the blue light beam BLp as the P-polarization component. In the present embodiment, the first light beam BL having the blue wavelength band corresponds to a first light beam having a first wavelength band in the appended claims. Further, the blue light beam BLp as the P-polarization component corresponds to the light polarized in the first polarization direction in the appended claims, and the blue light beam BLs as the S-polarization component corresponds to the light polarized in the second polarization direction in the appended claims.

It should be noted that in the present embodiment, there is adopted the configuration in which all of the light emitting elements 211 emit the blue light beam BLs as the S-polarization component, but it is possible to adopt a configuration in which the light emitting element 211 for emitting the blue light beam BLs as the S-polarization component and the light emitting element 211 for emitting the blue light beam BLp as the P-polarization component are mixed. According to this configuration, it is also possible to omit the rotary retardation device 213. Further, it is also possible for the light emitting element 211 to be formed of another solid-state light source such as an LED (Light Emitting Diode) instead of the semiconductor laser.

Configuration of First Optical Member

The first light beam BL including the blue light beam BLs as the S-polarization component and the blue light beam BLp as the P-polarization component enters the first optical member 22 along the +X direction. The first optical member 22 is formed of a plate type polarization split element. The first optical member 22 has a first transparent substrate 220, a first optical layer 221, and a second optical layer 222. The first transparent substrate 220 has a first surface 220a and a second surface 220b facing to respective directions opposite to each other. The first transparent substrate 220 is formed of a general optical glass plate. The first optical member in the present embodiment corresponds to a first polarization split element in the appended claims.

The first transparent substrate 220 is disposed so as to be tilted 45° with respect to the X axis and the Z axis. In other words, the first transparent substrate 220 is tilted 45° with respect to an X-Y plane and a Y-Z plane.

The first transparent substrate 220 is disposed so that the first surface 220a is directed toward the light source section 21. The first optical layer 221 is formed on the first surface 220a of the first transparent substrate 220. Therefore, the first optical layer 221 is disposed so as to be opposed to the light source section 21, and at the same time, tilted 45° with respect to the X-Y plane and the Y-Z plane.

The first optical layer 221 has a polarization split characteristic of transmitting the P-polarized light and reflecting the S-polarized light with respect to the light in the blue wavelength band. Therefore, the first optical member 22 transmits the blue light beam BLp as the P-polarization component along the +X direction, and reflects the blue light beam BLs as the S-polarization component toward the −Z direction out of the first light beam BL having a blue color which enters the first optical member 22 along the +X direction. The first optical layer 221 is formed of, for example, a dielectric multilayer film.

The second optical layer 222 is formed on the second surface 220b of the first transparent substrate 220. In other words, the second optical layer 222 is disposed at the +X direction side of the first optical layer 221. The second optical layer 222 has an optical characteristic of transmitting the P-polarization component out of the light in the blue wavelength band. Further, the second optical layer 222 has an optical characteristic of reflecting at least the S-polarization component out of the light in the green wavelength band as a longer wavelength band than the blue wavelength band. In the present embodiment, the second optical layer 222 is formed of, for example, a dichroic mirror. It should be noted that as the second optical layer 222, there can be used a dielectric multilayer film having a polarization split characteristic of transmitting the P-polarization component and reflecting the S-polarization component with respect to the light in the blue wavelength band and the green wavelength band.

It should be noted that since the first optical member 22 in the present embodiment is the plate type polarization split element, it is possible to separately design a function of the first optical layer 221 to be formed on the first surface 220a of the first transparent substrate 220 and a function of the second optical layer 222 to be formed on the second surface 220b of the first transparent substrate 220. Therefore, the film design of the first optical layer 221 and the second optical layer 222 becomes relatively easy.

The blue light beam BLp as the P-polarization component having been transmitted through the first optical layer 221 is transmitted through the first transparent substrate 220 to enter the second optical layer 222. The blue light beam BLp as the P-polarization component which enters the second optical layer 222 from the first optical layer 221 along the +X direction is transmitted by the first optical layer 221 toward the +X direction.

According to the first optical member 22 having the configuration described above, it is possible to separate the first light beam BL having been emitted from the light source section 21 into the blue light beam BLp as the P-polarization component and the blue light beam BLs as the S-polarization component, transmit the blue light BLp as the P-polarization component toward the +X direction to thereby make the blue light beam BLp enter the second optical member 23, and reflect the blue light beam BLs as the S-polarization component toward the −Z direction to make the blue light beam BLs enter the diffusion device 26.

Configuration of Second Optical Member

The second optical member 23 is disposed at the +X direction side of the first optical member 22. In other words, the second optical member 23 is disposed at the +X direction side of the second layer 222 of the first optical member 22. The blue light beam BLp as the P-polarization component having been transmitted through the first optical member 22 enters the second optical member 23. Similarly to the first optical member 22, the second optical member 23 is formed of a plate type polarization split element. The second optical member in the present embodiment corresponds to a second polarization split element in the appended claims.

The second optical member 23 has a second transparent substrate 230, a third optical layer 231, and a fourth optical layer 232. The second transparent substrate 230 has a third surface 230a and a fourth surface 230b facing to respective directions opposite to each other. The second transparent substrate 230 is formed of a general optical glass plate.

The second transparent substrate 230 is disposed so as to be tilted 45° with respect to the X axis and the Z axis. In other words, the second transparent substrate 230 is tilted 45° with respect to the X-Y plane and the Y-Z plane.

The second transparent substrate 230 is disposed so that the third surface 230a is directed toward the first optical member 22. In other words, the third surface 230a of the second transparent substrate 230 and the second surface 220b of the first transparent substrate 220 are opposed to each other. The third optical layer 231 is formed on the third surface 230a of the second transparent substrate 230. Therefore, the third optical layer 231 is disposed so as to be opposed to the second optical layer 222, and at the same time, tilted 45° with respect to the X-Y plane and the Y-Z plane.

The third optical layer 231 has a polarization split characteristic of transmitting the P-polarization component and reflecting the S-polarization component with respect to the light in the yellow wavelength band. Further, the third optical layer 231 has a characteristic of transmitting the P-polarization component with respect to the light in the blue wavelength band. Therefore, the blue light beam BLp as the P-polarization component which enters the third optical layer 231 along the +X direction from the second optical layer 222 is transmitted by the third optical layer 231 toward the +X direction. The third optical layer 231 is formed of, for example, a dielectric multilayer film. It should be noted that a dielectric multilayer film having a polarization split characteristic of transmitting the P-polarization component and reflecting the S-polarization component with respect to all of the light in the blue wavelength band, the red wavelength band, and the yellow wavelength band can be used as the third optical layer 231.

The fourth optical layer 232 is formed on the fourth surface 230b of the second transparent substrate 230. In other words, the fourth optical layer 232 is disposed at the +X direction side of the third optical layer 231. The fourth optical layer 232 has an optical characteristic of reflecting the light in the blue wavelength band, and at the same time, transmitting the light having the wavelength band longer than the blue wavelength band. The blue light beam BLp as the P-polarization component which enters the fourth optical layer 232 from the third optical layer 231 along the +X direction is reflected by the fourth optical layer 232 toward the −Z direction.

In the present embodiment, since the fourth optical layer 232 is formed of the dichroic mirror, it is possible for the fourth optical layer 232 to accurately separate the incident light by reflecting or transmitting the incident light without using the polarization.

According to the second optical member 23 in the configuration described above, the blue light beam BLp as the P-polarization component having been transmitted through the first optical member 22 to enter the second optical member 23 in the +X direction can be reflected toward the −Z direction to enter the wavelength conversion element 28.

Since the second optical member 23 in the present embodiment is the plate type polarization split element, it is possible to separately design a function of the third optical layer 231 to be formed on the third surface 230a of the second transparent substrate 230 and a function of the fourth optical layer 232 to be formed on the fourth surface 230b of the second transparent substrate 230. Therefore, the film design of the third optical layer 231 and the fourth optical layer 232 becomes relatively easy.

Configuration of First Retardation Element

The first retardation element 37 is disposed at the −Z direction side of the first optical member 22. In other words, the first retardation element 37 is disposed between the first optical member 22 and the diffusion device 26 on the −Z axis. The blue light beam BLs as the S-polarization component which has been reflected by the first optical layer 221 of the first optical member 22 toward the −Z direction enters the first retardation element 37. The first retardation element 37 is formed of a ¼ wave plate with respect to the blue wavelength band of the blue light beam BLs which enters the ¼ wave plate. The blue light beam BLs as the S-polarization component having been reflected by the first optical member 22 is converted by the first retardation element 37 into, for example, a blue light beam BLc1 as clockwise circularly polarized light, and is then emitted toward the first light collection element 25. In other words, the first retardation element 37 converts the polarization state of the blue light beam BLs which enters the first retardation element 37.

Configuration of First Light Collection Element

The first light collection element 25 is disposed at the −Z direction side of the first retardation element 37. In other words, the first light collection element 25 is disposed between the first retardation element 37 and the diffusion device 26 on the Z axis. The first light collection element 25 converges the blue light beam BLc1 which enters the first light collection element 25 from the first retardation element 37 on the diffusion plate 261 of the diffusion device 26. Further, the first light collection element 25 collimates a blue light beam BLc2 described later entering the first light collection element 25 from the diffusion device 26. It should be noted that although in the example shown in FIG. 3, the first light collection element 25 is constituted by a first lens 251 and a second lens 252, the number of lenses constituting the first light collection element 25 is not limited.

Configuration of Diffusion Device

The diffusion device 26 is disposed at the −Z direction side of the first light collection element 25. In other words, the diffusion device 26 is disposed at the −Z direction side of the first optical member 22. The blue light beam BLc1 entering the diffusion device 26 from the first light collection element 25 in the −Z direction is reflected by the diffusion device 26 the +Z direction while diffusing the blue light beam BLc1 so as to have an equivalent diffusion angle to that of the yellow light beam YL emitted from the wavelength conversion element 28 described later. The diffusion device 26 is provided with the diffusion plate 261 and a rotation device 262. The diffusion plate 261 preferably has a reflection characteristic as close to the Lambertian scattering as possible, and reflects the blue light beam BLc1 having entered the diffusion plate 261 in a wide-angle manner. The rotation device 262 is formed of a motor and so on, and rotates the diffusion plate 261 centering on a rotational axis R1 parallel to the +Z direction.

The diffusion plate 261 in the present embodiment corresponds to a diffusion element in the appended claims.

The blue light beam BLc1 having entered the diffusion plate 261 is reflected by the diffusion plate 261 to thereby be converted into the blue light beam BLc2 as circularly polarized light having an opposite rotational direction. In other words, the blue light beam BLc1 as the clockwise circularly polarized light is converted by the diffusion plate 261 into the blue light beam BLc2 as counterclockwise circularly polarized light. The blue light beam BLc2 emitted from the diffusion device 26 passes the first light collection element 25 toward the +Z direction, and then enters the first retardation element 37 once again. On this occasion, the blue light beam BLc2 entering the first retardation element 37 from the first light collection element 25 is converted by the first retardation element 37 into the blue light beam BLp as the P-polarization component. The blue light beam BLp thus converted enters the first optical member 22. In other words, the blue light beam BLp which is emitted from the diffusion plate 261 along the +Z direction, and then enters the first optical layer 221 is transmitted by the first optical layer 221 toward the +Z direction. The blue light beam BLp which is emitted from the first optical layer 221 along the +Z direction, and is transmitted through the first transparent substrate 220, and enters the second optical layer 222 is transmitted by the second optical layer 222 toward the +Z direction. In such a manner, the blue light beam BLp thus converted is emitted from the first optical member 22 toward the +Z direction.

Configuration of Second Light Collection Element

The second light collection element 27 is disposed at the −Z direction side of the second optical member 23. In other words, the second light collection element 27 is disposed between the second optical member 23 and the wavelength conversion element 28 on the Z axis. The second light collection element 27 converges the blue light beam BLs reflected by the second optical member 23 on the wavelength conversion element 28. Further, the second light collection element 27 collimates the yellow light beam YL which is emitted from the wavelength conversion element 28 and is described later, and then emits the result toward the second optical member 23. It should be noted that although in the example shown in FIG. 3, the second light collection element 27 is constituted by a first lens 271 and a second lens 272, the number of lenses constituting the second light collection element 27 is not limited.

Configuration of Wavelength Conversion Element

The wavelength conversion element 28 is disposed at the −Z direction side of the second light collection element 27. In other words, the wavelength conversion element 28 is disposed at the −Z direction side of the second optical member 23. The wavelength conversion element 28 is a reflective wavelength conversion element which is excited by the light entering the wavelength conversion element, and emits the light different in wavelength from the light having entered the wavelength conversion element toward an opposite direction to the incident direction of the light. In other words, the wavelength conversion element 28 performs the wavelength conversion on the incident light, and then emits the light on which the wavelength conversion has been performed toward the opposite direction to the incident direction of the light.

In the present embodiment, the wavelength conversion element 28 includes a yellow phosphor which is excited by blue light and emits yellow light. Specifically, the wavelength conversion element 28 includes, for example, an yttrium aluminum garnet (YAG) type phosphor containing cerium (Ce) as an activator agent. The wavelength conversion element 28 emits fluorescence having a yellow wavelength band longer than the blue wavelength band of the blue light beam BLp entering the wavelength conversion element 28 along the −Z direction from the fourth optical layer 232 of the second optical member 23, namely the yellow light beam YL as unpolarized light, toward the +Z direction. The yellow light beam YL has a wavelength band of, for example, 500 through 650 nm. The yellow light beam YL is light which includes a green light component and a red light component, and in which the S-polarization component and the P-polarization component are mixed with each other in each of the colored light components.

The fluorescence having the yellow wavelength band in the present embodiment, namely the yellow light beam YL as the unpolarized light, corresponds to the second light beam having a second wavelength band in the appended claims.

The yellow light beam YL emitted from the wavelength conversion element 28 is transmitted by the second light collection element 27 toward the +Z direction to thereby be collimated, and then enters the second optical member 23. Although the wavelength conversion element 28 in the present embodiment is a stationary wavelength conversion element, instead of this configuration, it is possible to use a rotary wavelength conversion element provided with a rotary device for rotating the wavelength conversion element 28 centering on a rotational axis parallel to the Z axis. In this case, a rise in temperature of the wavelength conversion element 28 is suppressed, and thus, it is possible to increase the wavelength conversion efficiency.

As described above, the third optical layer 231 of the second optical member 23 has a polarization split characteristic of reflecting the S-polarized light and transmitting the P-polarized light out of the incident light. Therefore, out of the yellow light beam YL as unpolarized light having entered the third optical layer 231, the yellow light beam YLs as the S-polarization component is reflected by the third optical layer 231 toward the −X direction. According to the second optical member 23 in the present embodiment, it is possible to emit the yellow light beam YLs as the S-polarization component toward the −X direction. The yellow light beam YLs as the S-polarization component enters the optical element 31.

Meanwhile, out of the yellow light beam YL as unpolarized light having entered the third optical layer 231, the yellow light beam YLp as the P-polarization component is transmitted through the third optical layer 231 toward the +Z direction to enter the fourth optical layer 232. As described above, the fourth optical layer 232 has an optical characteristic of transmitting the light having the longer wavelength band than the blue wavelength band. Therefore, the yellow light beam YLp as the P-polarization component which enters the fourth optical layer 232 from the third optical layer 231 along the +Z direction is transmitted by the fourth optical layer 232 toward the +Z direction.

According to the second optical member 23 in the present embodiment, it is possible to emit the yellow light beam YLp as the P-polarization component toward the +Z direction.

In the present embodiment, the yellow light beam YLp as the P-polarization component corresponds to a second light beam polarized in the first polarization direction in the appended claims, and the yellow light beam YLs as the S-polarization component corresponds to the second light beam polarized in the second polarization direction in the appended claims.

Configuration of Optical Element

The optical element 31 is disposed between the first optical member 22 and the second optical member 23 in a direction along the X axis. The optical element 31 is formed of a dichroic mirror having a characteristic of reflecting the light in the red wavelength band, and transmitting the light in the rest of the wavelength band, namely the blue wavelength band or the green wavelength band. Therefore, the optical element 31 transmits the blue light beam BLp in the blue wavelength band to be emitted toward the +X direction from the first optical member 22.

Further, the optical element 31 separates the yellow light beam YLs which enters the optical element 31 along the −X direction from the third optical layer 231 of the second optical member 23 into the green light beam GLs and the red light beam RLs. In other words, the optical element 31 transmits the green light beam GLs separated from the yellow light beam YLs toward the −X direction, and reflects the red light beam RLs separated from the yellow light beam YLs toward the +X direction.

It should be noted that the green light beam GLs is light having the green wavelength band out of the wavelength band of the yellow light beam YLs, and the red light beam RLs is light having the red wavelength band out of the wavelength band of the yellow light beam YLs.

The light having the green wavelength band in the present embodiment, namely the green light beam GLs, corresponds to a third light beam having a third wavelength band different from the second wavelength band in the appended claims. Further, the light having the red wavelength band in the present embodiment, namely the red light beam RLs, corresponds to a fourth light beam having a fourth wavelength band different from the third wavelength band in the appended claims.

The green light beam GLs transmitted through the optical element 31 enters the second optical layer 222 of the first optical member 22. As described above, the second optical layer 222 has an optical characteristic of reflecting at least the S-polarization component out of the light in the green wavelength band, and therefore, reflects the green light beam GLs included in the yellow light beam YLs toward the +Z direction.

In such a manner, the first optical member 22 is capable of emitting the yellow light beam YLs as the S-polarization component out of the yellow light beam YL emitted from the wavelength conversion element 28 toward the +Z direction.

Meanwhile, the red light beam RLs having been reflected by the optical element 31 enters the third optical layer 231 of the second optical member 23. As described above, the third optical layer 231 has a characteristic of reflecting the yellow light beam YLs, and therefore, reflects the red light beam RLs included in the yellow light beam YLs toward the −Z direction. The red light beam RLs reflected by the third optical layer 231 is collected by the second light collection element 27, and then enters the wavelength conversion element 28. In other words, the red light beam RLs which is reflected by the optical element 31 to thereby be separated from the yellow light beam YLs is reflected by the second optical member 23 toward the −Z direction to enter the wavelength conversion element 28.

Subsequently, a configuration of the optical element 31 will be described.

Figure 4:
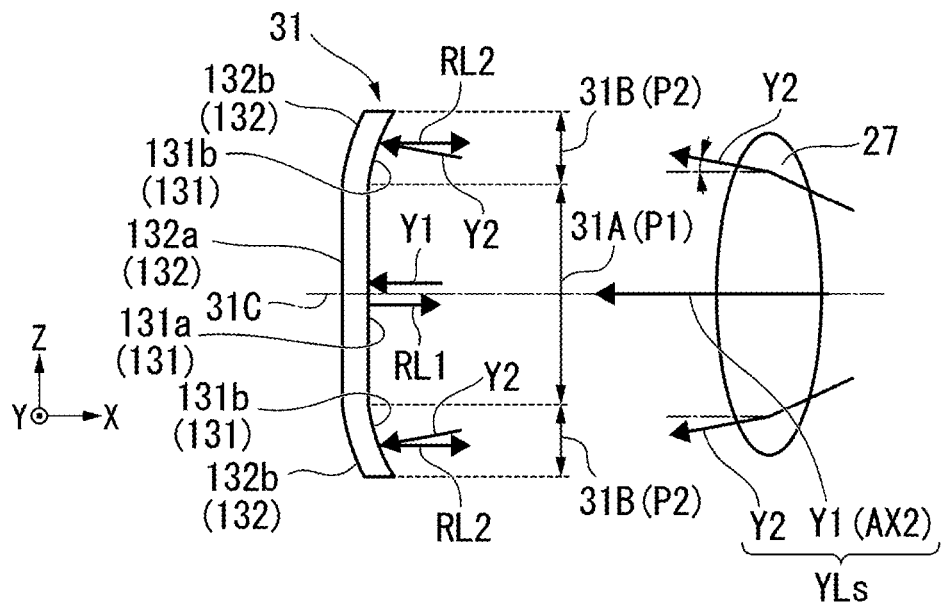
FIG. 4 is a cross-sectional view showing a configuration of an optical element.

FIG. 4 is a cross-sectional view showing the configuration of the optical element 31. FIG. 4 is a cross-sectional view of the optical element 31 along a plane parallel to the X-Z plane. In FIG. 4, in order to make the drawing eye-friendly, illustration of the second optical member 23 disposed between the optical element 31 and the second light collection element 27 is omitted, and the optical element 31 and the second light collection element 27 are disposed so as to linearly be arranged side by side.

As shown in FIG. 4, the optical element 31 has a plane of incidence of light 131 facing to the +X direction, and a light exit surface 132 facing to the −X direction. The plane of incidence of light 131 is a surface opposed to the second optical member 23, and the light exit surface 132 is a surface opposed to the first optical member 22. The plane of incidence of light 131 is a surface which the yellow light beam YL emitted from the second optical member 23 enters. Further, the light exit surface 132 is a surface from which the green light beam GLs separated from the yellow light beam YL is emitted. In the present embodiment, the plane of incidence of light 131 corresponds to a first surface in the appended claims, and the light exit surface 132 corresponds to a second surface in the appended claims.

The optical element 31 is disposed so that the optical axis 31C of the optical element 31 is made to coincide with the principal ray Ax2 of the yellow light beam YL emitted toward the −X direction from the second optical member 23. In other words, a light beam including the principal ray Ax2 of the yellow light beam YLs enters a central part P1 of the optical element 31. Hereinafter, out of the yellow light beam YLs, the light beam including the principal ray Ax2 entering the central part P1 of the optical element 31 is referred to as a central light beam Y1, and a light beam entering a peripheral part P2 of the optical element 31 is referred to as a peripheral light beam Y2.

The optical element 31 has a flat-surface area 31A and a concave-surface area 31B. The flat-surface area 31A has a planar shape formed of a flat plate shape, and the concave-surface area 31B has a concave surface shape formed of a curved shape curved toward the +X direction.

The flat-surface area 31A is located on the optical axis 31C of the optical element 31. In other words, the flat-surface area 31A is located in the central part P1 of the optical element 31. The central light beam Y1 out of the yellow light beam YLs enters the flat-surface area 31A. The concave-surface area 31B is located in the peripheral part P2 of the optical element 31. The peripheral light beam Y2 out of the yellow light beam YLs enters the concave-surface area 31B.

In the present embodiment, when making a plan view of the optical element 31 from a direction along the optical axis 31C of the optical element 31, the flat-surface area 31A and the concave-surface area 31B are concentrically disposed. The concave-surface area 31B is disposed so as to surround the periphery of the flat-surface area 31A. When making a plan view of the optical element 31 from a direction along the optical axis 31C of the optical element 31, the plane area of the flat-surface area 31A has a proportion of more than half to the total plane area of the optical element 31. In other words, the plane area of the central part P1 is larger than the plane area of the concave-surface area 31B.

The flat-surface area 31A includes an incident side flat surface 131a formed in the central part P1 of the plane of incidence of light 131, and an exit side flat surface 132a formed in the central part P1 of the light exit surface 132. It should be noted that the incident side flat surface 131a and the exit side flat surface 132a are surfaces parallel to each other.

The concave-surface area 31B includes an incident side concave surface 131b formed in the peripheral part P2 of the plane of incidence of light 131, and an exit side concave surface 132b formed in the peripheral part P2 of the light exit surface 132. In the present embodiment, the incident side concave surface 131b and the exit side concave surface 132b each have an aspherical shape.

In the present embodiment, the yellow light beam YL emitted from the wavelength conversion element 28 is collimated by the second light collection element 27, and is then reflected by the second optical member 23 to thereby enter the optical element 31.

However, due to an aberration caused in the first lens 271 or the second lens 272 constituting the second light collection element 27, a part of the yellow light beam YLs enters the optical element 31 as nonparallel light.

Specifically, the central light beam Y1 out of the yellow light beam YLs enters the optical element 31 as parallel light, but the peripheral light beam Y2 located on the periphery of the central light beam Y1 enters the optical element 31 as diverging light.

Here, a function obtained by the optical element 31 in the present embodiment will be described citing an optical element shaped like a flat plate as a comparative example.

Figure 5:
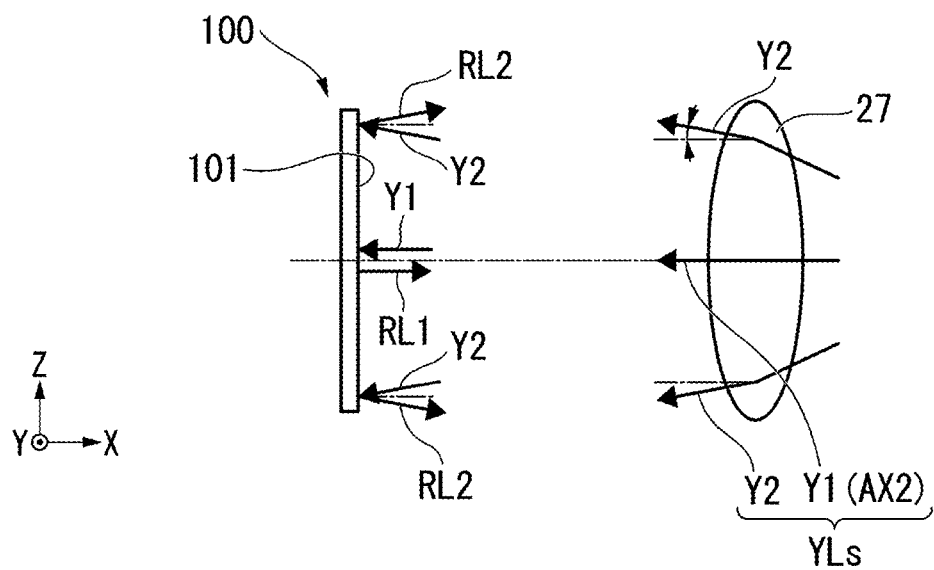
FIG. 5 is a cross-sectional view showing a configuration of an optical element in a comparative example.

FIG. 5 is a cross-sectional view showing a configuration of an optical element 100 in the comparative example. FIG.

5 is a cross-sectional view of the optical element 100 along a plane parallel to the X-Z plane.

As shown in FIG. 5, since the optical element 100 in the comparative example has a flat-plate shape, a plane of incidence of light 101 of the optical element 100 is a flat surface. As described above, the central light beam Y1 of the yellow light beam YLs enters the plane of incidence of light 101 of the optical element 100 as parallel light, and the peripheral light beam Y2 of the yellow light beam YLs enters the plane of incidence of light 101 of the optical element 100 as diverging light.

As described above, the yellow light beam YLs is separated into the green light and the red light in the optical element 100, and the red light is reflected by the optical element 100 to be emitted toward the +X direction. On this occasion, the red light beam RL1 separated from the central light beam Y1 having entered the plane of incidence of light 101 as parallel light is emitted from the plane of incidence of light 101 toward the +X direction as parallel light, and then enters the wavelength conversion element 28 via the same path as that of the central light beam Y1 of the yellow light beam YLs.

In contrast, the peripheral light beam Y2 enters the plane of incidence of light 101 as diverging light, and therefore, obliquely enters the plane of incidence of light 101. On this occasion, the red light beam RL2 separated from the peripheral light beam Y2 having obliquely entered the plane of incidence of light 101 as the diverging light is emitted from the plane of incidence of light 101 toward the +X direction as nonparallel light. Specifically, the red light beam RL2 is emitted from the optical element 31 as the diverging light spreading outward so as to get away from the optical axis 31C, and is therefore returned toward the wavelength conversion element 28 via a different path from that of the peripheral light beam Y2 of the yellow light beam YLs as a result. Therefore, there arises a problem that at least some components of the red light beam RL2 fail to enter the wavelength conversion element 28, and thus, the light use efficiency of the red light beam RL2 decreases.

In contrast, the optical element 31 in the present embodiment has the structure obtained by combining the flat-surface area 31A formed of the flat-surface shape and the concave-surface area 31B formed of the aspherical shape with each other as described above.

As shown in FIG. 4, in the optical element 31 in the present embodiment, the central light beam Y1 of the yellow light beam YLs enters the flat-surface area 31A as the parallel light, and the peripheral light beam Y2 of the yellow light beam YLs enters the concave-surface area 31B as the diverging light.

The central light beam Y1 enters the incident side flat surface 131a of the flat-surface area 31A from a normal direction along the optical axis 31C. The incident side flat surface 131a emits red light beam RL1 separated from the central light beam Y1 entering the incident side flat surface 131a along the optical axis 31C toward the +X direction as the parallel light to make the red light beam RL1 enter the wavelength conversion element 28 via the same path as that of the central light beam Y1 of the yellow light beam YLs.

With respect to the light which is emitted from the wavelength conversion element 28, and is then reflected by the incident side flat surface 131a of the flat-surface area 31A to enter the wavelength conversion element 28, the surface of the wavelength conversion element 28 is regarded as an object surface and a field. In other words, the red light beam RL1 reflected by the incident side flat surface 131a of the flat-surface area 31A keeps the conjugate relation, and can therefore efficiently enter the surface of the wavelength conversion element 28.

In contrast, the peripheral light beam Y2 enters the incident side concave surface 131b of the concave-surface area 31B from a direction crossing the optical axis 31C. The incident side concave surface 131b is curved so as to face to the incident direction of the peripheral light beam Y2. Therefore, the incident side concave surface 131b emits the red light beam RL2 separated from the peripheral light beam Y2 entering the incident side concave surface 131b as the diverging light toward the +X direction so as to come closer to the optical axis 31C. Thus, the red light beam RL2 is emitted toward the +X direction by the incident side concave surface 131b as parallel light along the optical axis 31C, and is converged by the second light collection element 27 on the wavelength conversion element 28 in good condition.

Therefore, according to the optical element 31 in the present embodiment, it is possible to make both of the red light beam RL1 separated from the central light beam Y1 of the yellow light beam YLs and the red light beam RL2 separated from the peripheral light beam Y2 of the yellow light beam YLs efficiently enter the wavelength conversion element 28. Thus, it is possible to solve the problem of a decrease in light use efficiency of the red light beam RLs caused when using the optical element 100 shaped like a flat plate as in the comparative example.

It should be noted that it is conceivable that a concave mirror in which the whole of the plane of incidence of light 131 is formed of the concave-surface area is used as the optical element 31. When the optical element 31 is formed of a complete concave mirror, the conjugate relation of the red light reflected by the plane of incidence of light 131 is lost to create a defocusing state in which the focal point is made short of the wavelength conversion element 28, and therefore, it becomes unachievable to make the red light beam RLs efficiently enter the wavelength conversion element 28. According to the optical element 31 in the present embodiment, by adopting the structure having the flat-surface area 31A and the concave-surface area 31B combined with each other, it is possible to realize both of the function of returning the red light beam to the wavelength conversion element 28 in the state of keeping the conjugate relation using the flat-surface area 31A, and the function of returning the diverging light to the wavelength conversion element 28 as the parallel light using the concave-surface area 31B.

As described above, the optical element 31 is disposed between the first optical member 22 and the second optical member 23 in the light source device 2 according to the present embodiment, but the optical element 31 can be disposed at the +Z direction side of the first optical member 22, namely between the first color separation element 29 and the first optical member 22.

As described above, the peripheral light beam Y2 enters the optical element 31 as the diverging light. Therefore, for example, when disposing the optical element 31 between the first color separation element 29 and the first optical member 22, the distance between the optical element 31 and the wavelength conversion element 28 increases, and therefore, it becomes difficult for a part of the peripheral light beam Y2 to enter the optical element 31. In the light source device 2 according to the present embodiment, by disposing the optical element 31 between the first optical member 22 and the second optical member 23, it is possible to return the peripheral light beam Y2 which enters the optical element 31 as the diverging light to the wavelength conversion element 28 from a position near to the wavelength conversion element 28. Therefore, the problem described above due to the increase in the distance between the optical element 31 and the wavelength conversion element 28 is prevented from occurring.

Further, the inventors have conducted a simulation of a condition of the red light beam which is returned to the wavelength conversion element 28 in the optical element 31 in the present embodiment and the optical element 100 in the comparative example.

Figure 6:
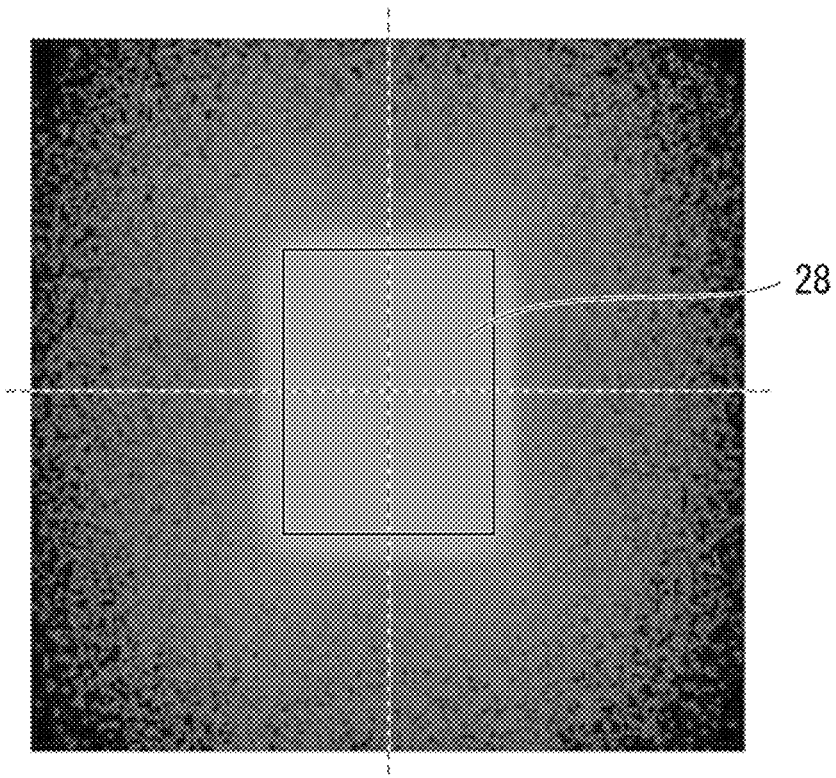
FIG. 6 is a diagram showing a simulation result in the comparative example.
Figure 7:
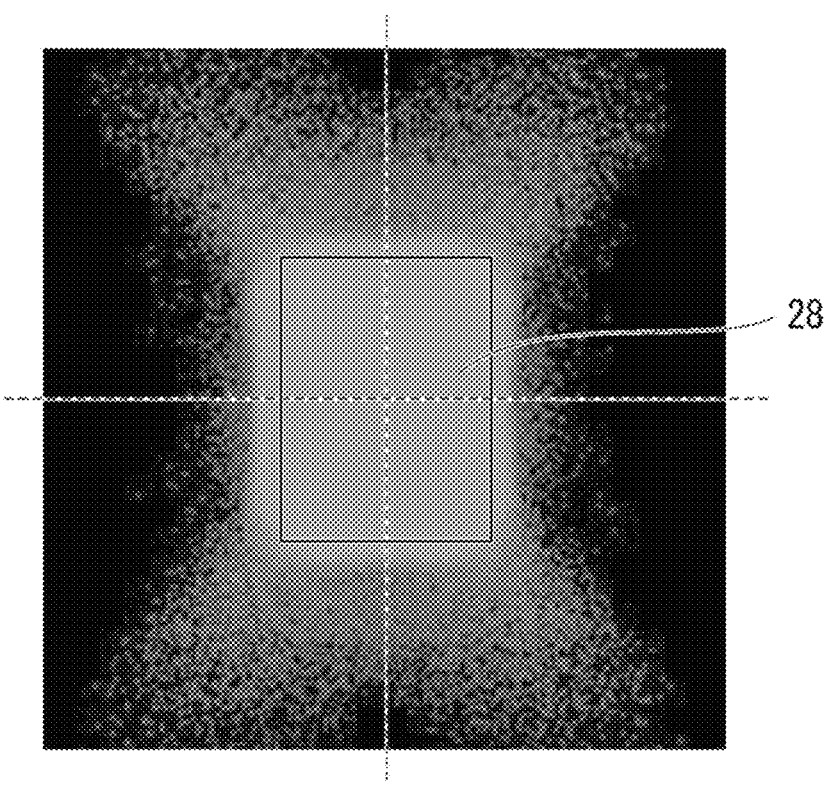
FIG. 7 is a diagram showing a simulation result in the first embodiment.

FIG. 6 and FIG. 7 are diagrams each showing the simulation result of the red light beam which enters the wavelength conversion element 28. FIG. 6 corresponds to the simulation result of the optical element 100 in the comparative example, and FIG. 7 corresponds to the simulation result of the optical element 31 in the present embodiment. It should be noted that in the simulation condition shown in FIG. 6, the optical element 100 is disposed between the first color separation element 29 and the first optical member 22. In the simulation condition shown in FIG. 7, the optical element 31 is disposed between the first optical member 22 and the second optical member 23.

As shown in FIG. 6, according to the optical element 100 in the comparative example, it can be confirmed that the red component which enters an area outside the wavelength conversion element 28 is relatively large in volume. In other words, it can be confirmed that in the configuration of the comparative example, it is unachievable to make the red light beam thus separated efficiently enter the surface of the wavelength conversion element 28.

In contrast, as shown in FIG. 7, according to the optical element 31 in the present embodiment, it has been confirmed that the red light beam thus separated is made to efficiently enter the surface of the wavelength conversion element 28 compared to the configuration in the comparative example. Specifically, it has been confirmed that the light intensity of the red light beam entering the wavelength conversion element 28 increases by about 12% in the simulation result shown in FIG. 7 compared to the simulation result shown in FIG. 6.

Further, the optical element 31 in the present embodiment is disposed between the first optical member 22 and the second optical member 23 in a direction along the X axis. Therefore, as shown in FIG. 3, the blue light beam BLp emitted from the first optical member 22 toward the +X direction is transmitted through the optical member 31 from the light exit surface 132 toward the plane of incidence of light 131. Further, the green light GLs included in the yellow light beam YLs emitted from the second optical member 23 toward the −X direction is transmitted through the optical element 31 from the plane of incidence of light 131 toward the light exit surface 132.

Figure 8:
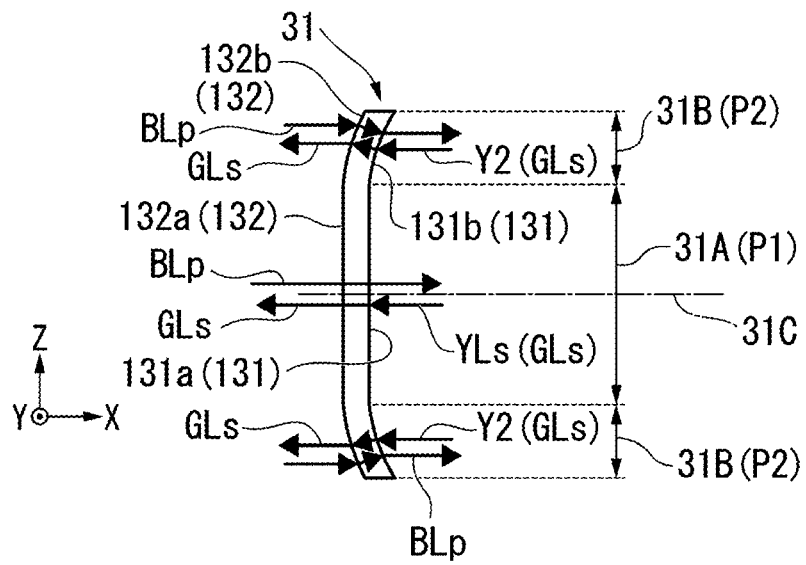
FIG. 8 is a diagram showing states of a blue light beam and a green light beam transmitted through the optical element.

FIG. 8 is a diagram showing states of the blue light beam BLp and the green light beam GLs transmitted through the optical element 31.

For example, when the blue light beam BLp is transmitted through the optical element 31, as shown in FIG. 8, the blue light beam BLp is refracted by an interface of the light exit surface 132, and is then refracted again by an interface of the plane of incidence of light 131. Therefore, when the proceeding direction of the blue light beam BLp changes between before and after the transmission through the optical element 31, there is a possibility that the blue light beam BLp fails to efficiently enter the wavelength conversion element 28 to decrease the light intensity of the yellow light beam YL.

In contrast, in the optical element 31 in the present embodiment, the plane of incidence of light 131 and the light exit surface 132 have an angle correction function of correcting an angle change caused in the blue light beam BLp when entering the optical element 31, and then emitting the blue light beam BLp corrected in the angle change. In the optical element 31, the surface shape of each of the plane of incidence of light 131 and the light exit surface 132 is set so as to decrease the angle change caused in the blue light beam BLp.

The angle correction function by the plane of incidence of light 131 and the light exit surface 132 will hereinafter be described citing the blue light beam BLp as an example.

As described above, the blue light beam BLp enters the optical element 31 as parallel light.

In the present embodiment, in the flat-surface area 31A, the incident side flat surface 131a formed in the central part P1 of the plane of incidence of light 131, and the exit side flat surface 132a formed in the central part P1 of the light exit surface 132 are formed of the surfaces parallel to each other. Therefore, the blue light beam BLp having entered the flat-surface area 31A is emitted from the flat-surface area 31A while being kept as the parallel light without causing the angle change when transmitted through the exit side flat surface 132a and the incident side flat surface 131a.

Further, in the present embodiment, in the concave-surface area 31B, the incident side concave surface 131b formed in the peripheral part P2 of the plane of incidence of light 131, and the exit side concave surface 132b formed in the peripheral part P2 of the light exit surface 132 are each formed of the aspherical surface. In this case, the blue light beam BLp is refracted by the interface of the exit side concave surface 132b toward the direction of coming closer to the optical axis 31C when entering the concave-surface area 31B, and is then refracted again by the interface of the incident side concave surface 131b toward the direction of getting away from the optical axis 31C when being emitted from the concave-surface area 31B. In other words, the surface shapes of the exit side concave surface 132b and the incident side concave surface 131b are set to shapes of deflecting the blue light beam BLp so that the angle change does not occur between before and after the transmission through the optical element 31.

Thus, the blue light beam BLp having entered the concave-surface area 31B is transmitted through the exit side concave surface 132b and the incident side concave surface 131b to thereby be emitted from the concave-surface area 31B as the parallel light without causing the angle change between before and after the transmission through the optical element 31.

Similarly, since the green light beam GLs is refracted by the interface of each of the plane of incidence of light 131 and the light exit surface 132 when being transmitted through the optical element 31, when the proceeding direction of the green light beam GLs changes between before and after the transmission through the optical element 31, there is a possibility that the green light beam GLs is not efficiently emitted outside from the first color separation element 29 disposed in the posterior stage to decrease the extraction light intensity of the green light beam GLs.

In contrast, in the optical element 31 in the present embodiment, the plane of incidence of light 131 and the light exit surface 132 have the angle correction function of correcting an angle change caused in the green light beam GLs when entering the optical element 31, and then emitting the green light beam GLs corrected in the angle change. The surface shapes of the plane of incidence of light 131 and the light exit surface 132 are set to shapes of deflecting the green light beam GLs so that the angle change does not occur between before and after the transmission through the optical element 31.

As described above, the peripheral light beam Y2 out of the yellow light beam YLs enters the plane of incidence of light 131 (the incident side concave surface 131b) as the diverging light. Therefore, in the optical element 31 in the present embodiment, the aspherical shapes of the incident side concave surface 131b and the exit side concave surface 132b are adjusted so as to emit the green light beam GLs separated from the peripheral light beam Y2 at the same angle as an angle at which the green light beam GLs enters the plane of incidence of light 131 (the incident side concave surface 131b) from the light exit surface 132 (the exit side concave surface 132b).

As described above, according to the optical element 31 in the present embodiment, it is possible to prevent an occurrence of the problem of a decrease in light intensity of the yellow light beam YL and the problem of a decrease in light use efficiency of the green light beam GLs caused by the transmission of the blue light beam BLp or the green light beam GLs through the optical element 31.

Configuration of Third Retardation Element

The light source device 2 according to the present embodiment is provided the third retardation element 35 disposed on the light path of the red light beam RLs between the second optical member 23 and the wavelength conversion element 28. In other words, the third retardation element 35 is disposed between the second optical member 23 and the wavelength conversion element 28 on the Z axis. The third retardation element 35 is formed of a ¼ wave plate with respect to the red wavelength band. The third retardation element 35 is formed of a wavelength-selective retardation element which has a characteristic of providing a phase difference as much as ¼ of the red wavelength band to the red light, and not providing the phase difference to the light having a wavelength band other than the red wavelength band, namely the blue light and the green light. Specifically, as the wavelength-selective retardation element, it is possible to use ColorSelect® (trade name; product of ColorLink Inc.).

The third retardation element 35 provides the phase difference of ¼ only to the light in the red wavelength band. Therefore, the blue light beam BLp as the P-polarization component emitted from the second optical member 23 is transmitted through the third retardation element 35, and then enters the wavelength conversion element 28 via the second light collection element 27.

The red light beam RLs is converted by the third retardation element 35 into, for example, a red light beam RLc1 as the clockwise circularly polarized light, and is then emitted toward the second light collection element 27. In other words, the third retardation element 35 converts the polarization state of the red light beam RLs which enters the third retardation element 35.

The red light beam RLc1 which has been converted by the third retardation element 35 into the clockwise circularly polarized light enters the wavelength conversion element 28.

Figure 9:
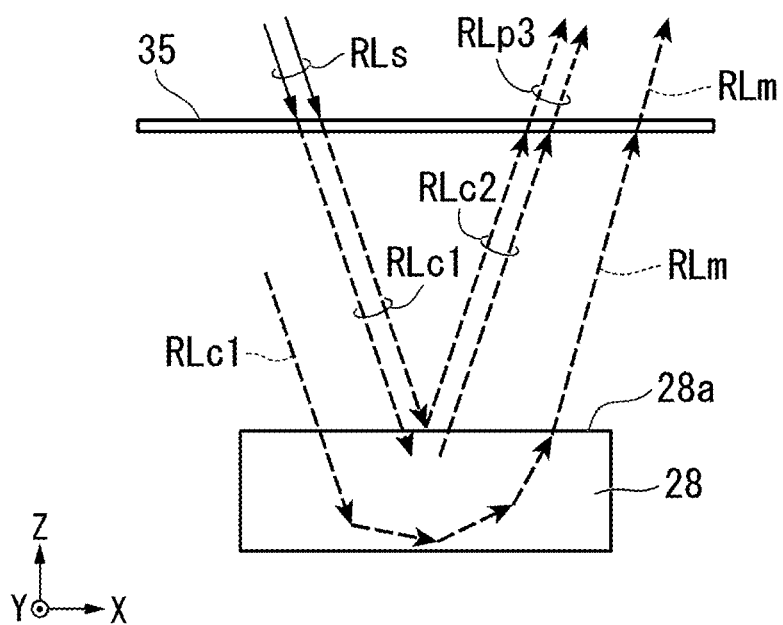
FIG. 9 is a schematic diagram showing a polarization state of a red light beam which enters a wavelength conversion element.

FIG. 9 is a schematic diagram showing the polarization state of the red light which is transmitted through the third retardation element 35 and then enters the wavelength conversion element 28. In FIG. 9, illustration of the second light collection element 27 is omitted in order to make the drawing eye-friendly.

As shown in FIG. 9, since the yellow phosphor included in the wavelength conversion element 28 hardly absorbs the yellow light beam having entered the wavelength conversion element 28 from the outside, the yellow phosphor hardly absorbs the red light beam RLc1 as well. Therefore, the red light beam RLc1 having entered the wavelength conversion element 28 is repeatedly reflected inside the wavelength conversion element 28 to thereby be emitted outside the wavelength conversion element 28 as the red light beam as unpolarized light including the S-polarized light and the P-polarized light mixed with each other together with the yellow light beam YL generated in the yellow phosphor. The red light beam RLm as the unpolarized light emitted from the wavelength conversion element 28 includes the S-polarization component and the P-polarization component half and half.

Out of the red light beam RLc1 having entered the wavelength conversion element 28, the light reflected by a surface 28a of the wavelength conversion element 28, or the light back-scattered by a surface layer of the wavelength conversion element 28 is hardly disturbed in polarization. Therefore, as shown in FIG. 9, the red light beam RLc1 which has been surface-reflected, or back-scattered by the wavelength conversion element 28 is emitted from the wavelength conversion element 28 as a red light beam RLc2 as counterclockwise circularly polarized light. The red light beam RLc2 as the counterclockwise circularly polarized light passes the second light collection element 27 toward the +Z direction, and then enters the third retardation element 35 once again. On this occasion, the red light beam RLc2 which enters the third retardation element 35 from the second light collection element 27 is converted by the third retardation element 35 into a red light beam RLp3 as the P-polarization component. The red light beam RLp3 thus converted enters the second optical member 23.

Similarly to the yellow light beam YLp, the red light beam RLp3 as the P-polarization component having entered the second optical member 23 is transmitted through the second optical member 23 to be emitted toward the +Z direction. In other words, according to the light source device 2 related to the present embodiment, since the third retardation element is provided, the red light beam which has been surface-reflected or back-scattered by the wavelength conversion element 28 can be taken out to the outside.

Here, the red light beam RLm emitted as the unpolarized light from the wavelength conversion element 28 is kept as the unpolarized light without changing in polarization state even when being transmitted through the third retardation element 35, and then enters the second optical member 23.

Similarly to the yellow light beam YLp, the red light beam RLm as the unpolarized light having entered the second optical member 23 is separated by the third optical layer 231 into the red light beam RLp1 as the P-polarization component and the red light beam RLs1 as the S-polarization component as shown in FIG. 3. In other words, similarly to the yellow light beam YLs, the red light beam RLs1 as the S-polarization component enters the optical element 31, and is then reflected by the optical element 31 to thereby return to the wavelength conversion element 28 once again. The red light beam RLs1 as the P-polarization component reflected by the optical element 31 returns to the wavelength conversion element 28 once again via the third retardation element 35 similarly to the red light beam RLs, and is then emitted from the wavelength conversion element 28 as unpolarized light or circularly polarized light.

Further, the red light beam RLp1 as the P-polarization component which has been transmitted through the third optical layer 231 toward the +Z direction is transmitted by the fourth optical layer 232 toward the +Z direction. In other words, similarly to the yellow light beam YLp, the red light beam RLp1 as the P-polarization component is emitted from the second optical member 23 toward the +Z direction.

In the present embodiment, the red light beam RLm as the unpolarized light corresponds to the fourth light beam emitted from the wavelength conversion element in the appended claims. Further, the red light beam RLp1 as the P-polarization component corresponds to the light polarized in the first polarization direction out of the fourth light beam in the appended claims. Further, the red light beam RLs1 as the S-polarization component corresponds to the light polarized in the second polarization direction out of the fourth light beam in the appended claims.

Configuration of Light Tunnel

Figure 10:
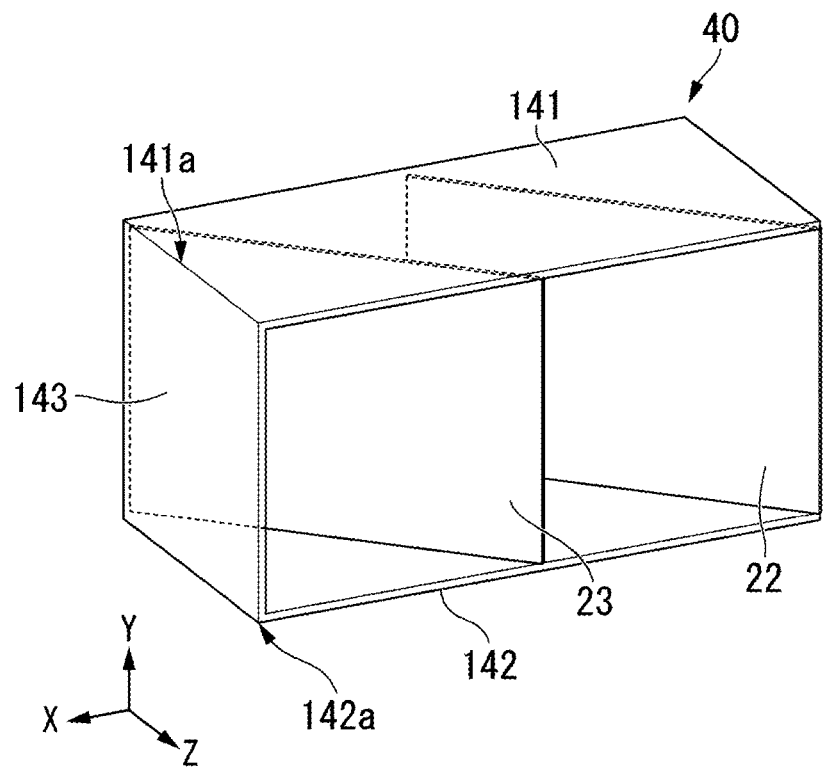
FIG. 10 is a perspective view showing a configuration of a light tunnel.
Figure 11:
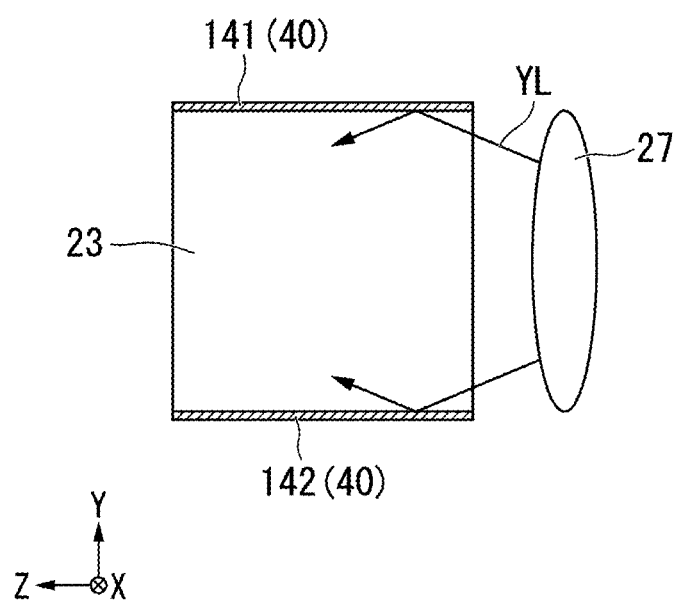
FIG. 11 is a side view of the light source device viewed from a −X direction toward a +X direction.

FIG. 10 is a perspective view showing a configuration of the light tunnel 40. It should be noted that in FIG. 10, illustration of the optical element 31 is omitted in order to make the drawing eye-friendly. FIG. 11 is a side view of the light tunnel 40 viewed from the −X direction toward the +X direction. In FIG. 11, there is shown a green light beam GL which enters the second optical member 23 via the second light collection element 27.

As shown in FIG. 10, the light tunnel 40 has a first mirror 141, a second mirror 142, and a third mirror 143. The first mirror 141, the second mirror 142, and the third mirror 143 are bonded to each other with an adhesive or the like. Further, the first transparent substrate 220 and the second transparent substrate 230 are bonded to the first mirror 141 and the second mirror 142 with an adhesive or the like. In the light tunnel 40 constituted by the first mirror 141, the second mirror 142, and the third mirror 143, all of the surfaces at the sides opposed respectively to the first optical member 22 and the second optical member 23 are made to be reflecting surfaces. Thus, the light tunnel 40 has a function of reflecting the light which proceeds toward the optical element in the posterior stage in a spreading manner to thereby suppress the loss of the light. Further, the light tunnel 40 has a function as a support member for supporting the first transparent substrate 220 and the second transparent substrate 230.

The first mirror 141 is disposed at the +Y direction side of the first transparent substrate 220 and the second transparent substrate 230. In the first mirror 141, at least an inner surface side which faces the first transparent substrate 220 and the second transparent substrate 230 is made to be a light reflecting surface.

The second mirror 142 is disposed at the −Y direction side of the first transparent substrate 220 and the second transparent substrate 230. In the second mirror 142, at least an inner surface side which faces the first transparent substrate 220 and the second transparent substrate 230 is made to be a light reflecting surface. The first mirror 141 and the second mirror 142 are disposed along the X-Y plane, and are opposed to each other.

The third mirror 143 is disposed so as to cross the first transparent substrate 220 and the second transparent substrate 230. The third mirror 143 is disposed along the Y-Z plane to couple an end part 141a at the +X direction side of the first mirror 141 and an end part 142a at the +X direction side of the second mirror 142 to each other. The third mirror 143 and the second transparent substrate 230 forms an angle of 45°. In the third mirror 143, at least an inner surface side which faces the second transparent substrate 230 is made to be a light reflecting surface.

It should be noted that in the present embodiment, the +Y direction corresponds to a fifth direction in the appended claims, and the −Y direction corresponds to a sixth direction in the appended claims.

It should be noted that the light tunnel 40 is not necessarily required to have the configuration in which the three plate members are bonded to each other as in the present embodiment, and can have a configuration in which at least two plate members are integrally formed.

In the present embodiment, although the yellow light beam YL emitted from the wavelength conversion element 28 is substantially collimated by the second light collection element 27, some components thereof enter the second optical member 23 in a diverging state due to an influence of an aberration. Here, as a comparative example, a light source device obtained by eliminating the light tunnel 40 from the light source device 2 according to the present embodiment will be considered.

Since the second optical member 23 is the plate type polarization split element, when the light tunnel 40 is not provided as in the light source device according to the comparative example, there is a possibility that a part of the yellow light beam YL emitted from the second light collection element 27 spreads outside the second optical member 23, and thus, the light use efficiency of the yellow light beam YL decreases. It should be noted that when using the plate type polarization split element as the second optical member 23, it becomes possible to deflect the light, which is emitted from the second light collection element 27 with a wide angle, using a prism surface to take the light inside, but it become unachievable to obtain an advantage such as easiness of the film design due to the use of the plate type polarization split element.

In contrast, in the light source device 2 according to the present embodiment, since there is provided the light tunnel 40, as shown in FIG. 11, by reflecting the yellow light beam YL having spread in the Y direction using the first mirror 141 and the second mirror 142, it is possible to take the yellow light beam YL in the second optical member 23. In other words, according to the light source device 2 related to the present embodiment, it is possible to take the light, which is emitted with a wide angle from the second light collection element, inside as when configuring the second optical member with a prism type polarization split element despite the plate type polarization split element is used as the second optical member 23. Thus, it is possible to increase the light use efficiency of the yellow light beam YL.

It should be noted that although not shown in the drawings, for example, the yellow light beam YL having spread in the +X direction is reflected by the third mirror 143, and can therefore be taken in the second optical member 23. Further, by reflecting the blue light beam BLp having been emitted from the first light collection element 25 and having spread in the Y direction using the first mirror 141 and the second mirror 142, it is possible to take the blue light beam BLp in the first optical member 22. Thus, it is possible to increase the light use efficiency of the blue light beam BLp. Further, regarding the first light beam BL having been emitted from the light source section 21 in the state of spreading in the Y direction, by reflecting the first light beam BL using the first mirror 141 and the second mirror 142, it is possible to efficiently take the first light beam BL in the first optical member 22. Thus, it is possible to increase the light use efficiency of the first light beam BL.

Configuration of First Color Separation Element

Figure 12:
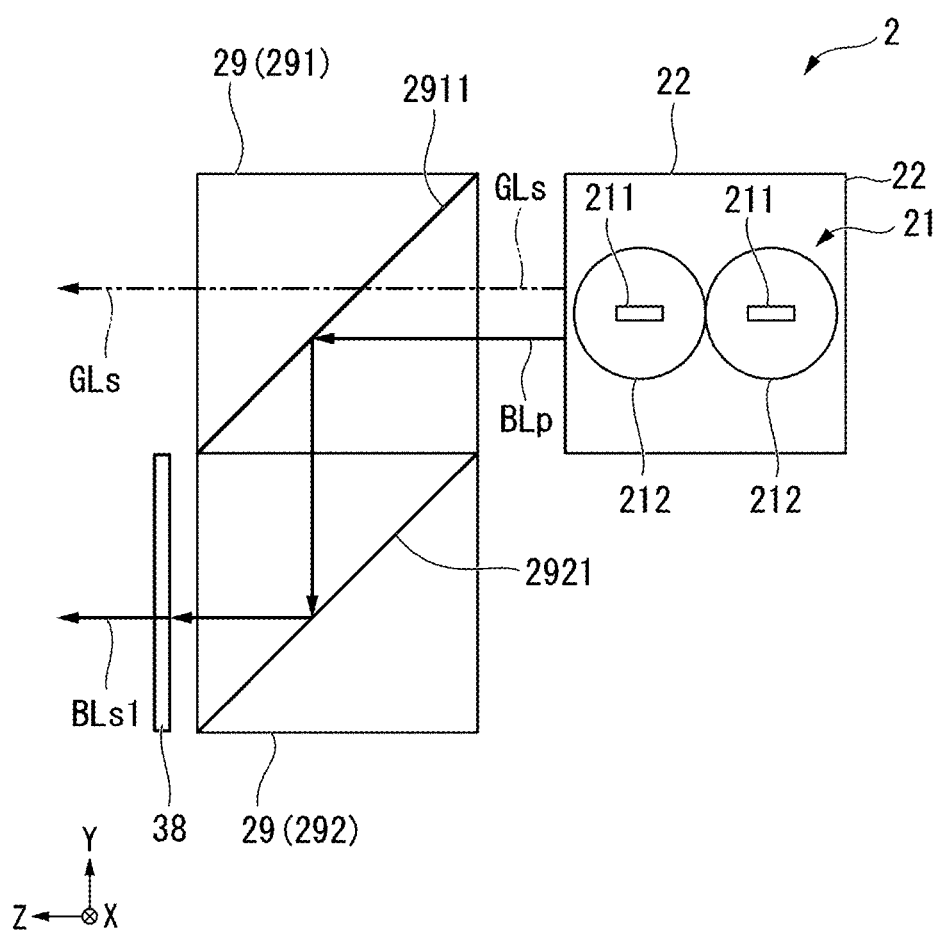
FIG. 12 is a side view of the light source device viewed from a −X direction.

FIG. 12 is a side view of the light source device 2 viewed from the −X direction. In other words, FIG. 12 shows the state of the first color separation element 29, the fifth retardation element 38, and so on viewed from the −X direction. In FIG. 12, in order to make the drawing eye-friendly, illustration of the first retardation element 37, the first light collection element 25, the diffusion device 26, and so on is omitted.

As shown in FIG. 12, the first color separation element 29 is disposed at the +Z direction side of the first optical member 22. The first color separation element 29 has a dichroic prism 291 and the reflecting prism 292. The dichroic prism 291 and the reflecting prism 292 are arranged side by side along the Y axis. The first color separation element 29 separates the light emitted toward the +Z direction from the first optical member 22 into the green light beam GLs and the blue light beam BLp.

The light including the green light beam GLs and the blue light beam BLp emitted from the first optical member 22 enters the dichroic prism 291. The dichroic prism 291 is formed of a prism type color separation element formed by combining two base members each having a substantially isosceles right triangular prismatic shape with each other to form a substantially rectangular solid shape. On the interface between the two base members, there is disposed a color separation layer 2911. The color separation layer 2911 is tilted 45° with respect to the Y axis and the Z axis. In other words, the color separation layer 2911 is tilted 45° with respect to the X-Y plane and the X-Z plane.

The color separation layer 2911 functions as a dichroic mirror which reflects the blue light component and transmits a colored light beam having a longer wavelength band than the blue wavelength band, namely the green light component, out of the incident light. Therefore, the green light beam GLs out of the light beam having entered the dichroic prism 291 from the first optical member 22 is transmitted through the color separation layer 2911 toward the +Z direction to be emitted outside the dichroic prism 291.

In contrast, the blue light beam BLp out of the light beam having entered the dichroic prism 291 from the first optical member 22 is reflected toward the −Y direction by the color separation layer 2911. In the case of the present embodiment, the blue light beam BLp is the light as the S-polarization component with respect to the color separation layer 2911 of the dichroic prism 291, and the green light beam GLs is the light as the P-polarization component with respect to the color separation layer 2911 of the dichroic prism 291. In other words, the color separation layer 2911 in the present embodiment reflects the blue light beam BLp which enters the color separation layer 2911 as the light as the S-polarization component, and transmits the green light beam GLs which enters the color separation layer 2911 as the light as the P-polarization component. In general, the light as the S-polarization component is easy to reflect, and the light as the P-polarization component is easy to transmit. Since it is sufficient for the color separation layer 2911 in the present embodiment to be designed so as to transmit the P-polarized light and reflect the S-polarized light as described above, the film design of the color separation layer 2911 can be performed with relative ease.

It should be noted that it is possible to adopt a dichroic mirror having the color separation layer 2911 instead of the dichroic prism 291. Further, it is possible for the first color separation element 29 to have a configuration having a polarization split element having a polarization split layer, and the reflecting prism 292. Even when a polarization split element which, for example, transmits the green light beam GLs having entered the polarization split element toward the +Z direction, and reflects the blue light beam BLp in the −Y direction toward the reflecting prism 292 is adopted in the first color separation element 29 instead of the dichroic prism 291, it is possible to separate the green light beam GLs and the blue light beam BLp from each other similarly to the first color separation element 29 having the dichroic prism 291.

The reflecting prism 292 is disposed at the −Y direction side of the dichroic prism 291. The blue light beam BLp reflected by the color separation layer 2911 enters the reflecting prism 292. The reflecting prism 292 is a prism type reflecting element formed by combining two base members each having a substantially isosceles right triangular prismatic shape with each other to form a substantially rectangular solid shape. On the interface between the two base members, there is disposed a reflecting layer 2921. The reflecting layer 2921 is tilted 45° with respect to the +Y direction and the +Z direction. In other words, the reflecting layer 2921 is tilted 45° with respect to the X-Y plane and the X-Z plane. In other words, the reflecting layer 2921 and the color separation layer 2911 are arranged in parallel to each other.

The blue light beam BLp which enters the reflecting layer 2921 in the −Y direction from the dichroic prism 291 is reflected toward the +Z direction by the reflecting layer 2921. The blue light beam BLp reflected by the reflecting layer 2921 is emitted from the reflecting prism 292 toward the +Z direction. It should be noted that it is possible to adopt a reflecting mirror having the reflecting layer 2921 instead of the reflecting prism 292.

Configuration of Fifth Retardation Element

The fifth retardation element 38 is disposed at the +Z direction side of the reflecting prism 292. In other words, the fifth retardation element 38 is disposed on the light path of the blue light beam BLp emitted from the reflecting prism 292. The fifth retardation element 38 is formed of a ½ wave plate with respect to the blue wavelength band which the blue light beam BLp entering the ½ wave plate has. The fifth retardation element 38 converts the blue light beam BLp which enters the fifth retardation element 38 from the reflecting prism 292 into the blue light beam BLs1 as the S-polarization component. The blue light beam BLs1 having been converted by the fifth retardation element 38 into the S-polarization component is emitted from the light source device 2 toward the +Z direction, and then enters the homogenization device 4 shown in FIG. 1. It should be noted that the fifth retardation element 38 can be disposed so as to have contact with a surface from which the blue light beam BLp is emitted of the reflecting prism 292.

The blue light beam BLs1 is spatially separated from the green light beam GLs, and is emitted from an exit position different from the exit position of the green light beam GLs in the light source device 2, and then enters the homogenization device 4. In particular, the blue light beam BLs1 is emitted from the exit position distant toward the −Y direction from the exit position of the green light beam GLs in the light source device 2, and then enters the homogenization device 4.

Figure 13:
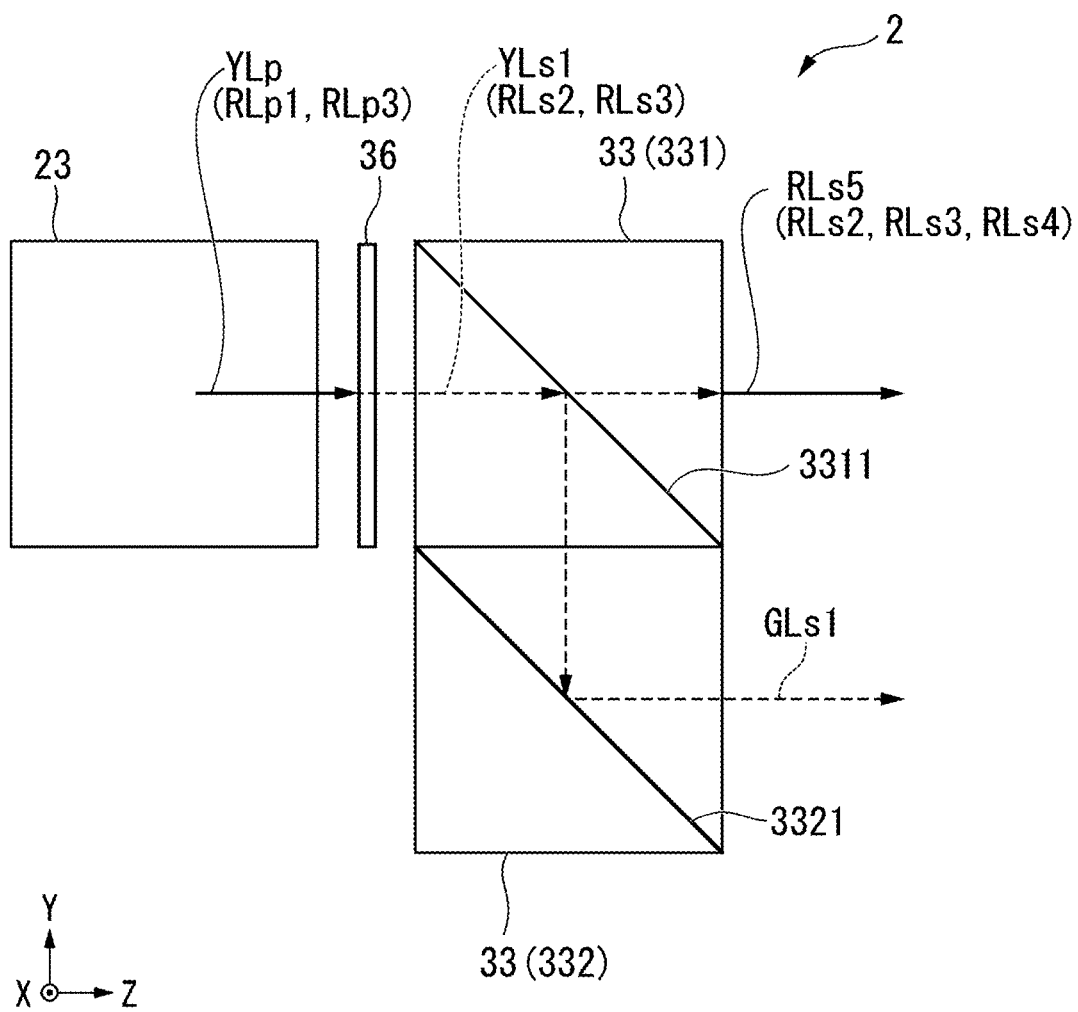
FIG. 13 is a side view of the light source device viewed from a +X direction.

FIG. 13 is a side view of the light source device 2 viewed from the +X direction. In other words, FIG. 13 shows the fourth retardation element 36 and the second color separation element 33 viewed from the +X direction. It should be noted that in FIG. 13, the second light collection element 27 and the wavelength conversion element 28 are omitted from the illustration.

Configuration of Fourth Retardation Element

As shown in FIG. 3 and FIG. 13, the fourth retardation element 36 is disposed at the +Z direction side of the second optical member 23. The yellow light beam YLp having been transmitted through the second optical member 23 enters the fourth retardation element 36. Further, the red light beam RLp1 and the red light beam RLp3 which are separated from the yellow light beam YLs by the optical element 31, then emitted from the wavelength conversion element 28, and is then transmitted through the second optical member 23 enter the fourth retardation element 36. The fourth retardation element 36 is formed of a ½ wave plate with respect to the yellow wavelength band of the yellow light beam YLp and the red wavelength band of the red light beam RLp1 and the red light beam RLp3. The fourth retardation element 36 converts the yellow light beam YLp as the P-polarization component into a yellow light beam YLs1 as the S-polarization component, converts the red light beam RLp1 as the P-polarization component into a red light beam RLs2 as the S-polarization component, and converts the red light beam RLp3 as the P-polarization component into a red light beam RLs3 as the S-polarization component. The yellow light beam YLs1, the red light beam RLs2, and the red light beam RLs3 each converted into the S-polarization component enter the second color separation element 33.

Configuration of Second Color Separation Element

As shown in FIG. 13, the second color separation element 33 is disposed at the +Z direction side of the second optical member 23. The second color separation element 33 has a dichroic prism 331 and a reflecting prism 332. The dichroic prism 331 and the reflecting prism 332 are arranged side by side along the Y axis. The yellow light beam YLs1 which has been emitted from the second optical member 23 toward the +Z direction and then converted by the fourth retardation element 36 into the S-polarization component is separated by the second color separation element 33 into a green light beam GLs1 and a red light beam RLs4.

The dichroic prism 331 is formed of a prism type color separation element similarly to the dichroic prism 291. On the interface between the two base members, there is disposed a color separation layer 3311. The color separation layer 3311 is tilted 45° with respect to the +Y direction and the +Z direction. In other words, the color separation layer 3311 is tilted 45° with respect to the X-Y plane and the X-Z plane. The color separation layer 3311 and the reflecting layer 3321 are arranged in parallel to each other.

The color separation layer 3311 functions as a dichroic mirror for reflecting the green light component of the incident light, and transmitting the red light component thereof. Therefore, the red light beam RLs4 as the S-polarized light out of the yellow light beam YLs1 having entered the dichroic prism 331 is transmitted through the color separation layer 3311 toward the +Z direction to be emitted outside the dichroic prism 331. Further, the red light beam RLs2 and the red light beam RLs3 having been converted by the fourth retardation element 36 into the S-polarization component are transmitted through and emitted from the color separation layer 3311 toward the +Z direction together with the red light beam RLs4 as the S-polarization component. Hereinafter, the red light beam RLs2, the red light beam RLs3, and the red light beam RLs4 are correctively referred to simply as a red light beam RLs5.

The red light beam RLs5 is emitted from the light source device 2 toward the +Z direction, and then enters the homogenization device 4. In other words, the red light beam RLs5 is spatially separated from the green light beam GLs and the blue light beam BLs1, and is emitted from a position different from those of the green light beam GLs and the blue light beam BLs1, and then enters the homogenization device 4. In other words, the red light beam RLs5 is emitted from the exit position distant toward the +X direction from the exit position of the green light beam GLs in the light source device 2, and then enters the homogenization device 4.

In contrast, the green light beam GLs1 out of the yellow light beam YLs1 having entered the dichroic prism 331 is reflected toward the −Y direction by the color separation layer 3311. It should be noted that it is possible to use a dichroic mirror having the color separation layer 3311 instead of the dichroic prism 331.

The reflecting prism 332 is disposed at the −Y direction side of the dichroic prism 331. The reflecting prism 332 has substantially the same configuration as the reflecting prism 292. Specifically, the reflecting prism 332 has a reflecting layer 3321 which is parallel to the color separation layer 3311, and the reflecting layer 2921.

The green light beam GLs1 which is reflected by the color separation layer 3311, and then enters the reflecting layer 3321 is reflected by the reflecting layer 3321 toward the +Z direction. The green light beam GLs1 having been reflected by the reflecting layer 3321 is emitted outside the reflecting prism 332. It should be noted that it is possible to adopt a reflecting mirror having the reflecting layer 3321 instead of the reflecting prism 332.

The green light beam GLs1 is spatially separated from the red light beam RLs5, and is emitted from an exit position different from the exit position of the red light beam RLs5 in the light source device 2, and then enters the homogenization device 4. In other words, the green light beam GLs1 is spatially separated from the green light beam GLs, the blue light beam BLs1, and the red light beam RLs5, and is emitted from a position different from those of the green light beam GLs, the blue light beam BLs1, and the red light beam RLs5, and then enters the homogenization device 4. In other words, the green light beam GLs1 is emitted from the exit position which is distant toward the −Y direction from the exit position of the red light beam RLs5 in the light source device 2, and is distant toward the +X direction from the exit position of the blue light beam BLs1, and then enters the homogenization device 4.

Configuration of Homogenization Device

As shown in FIG. 1, the homogenization device 4 homogenizes the illuminance in the image formation area of the light modulation device 6 irradiated with the light beams emitted from the light source device 2. The homogenization device 4 has a first multi-lens 41, a second multi-lens 42, and a superimposing lens 43.

The first multi-lens 41 has a plurality of lenses 411 arranged in a matrix in a plane perpendicular to a central axis of the light L entering the first multi-lens 41 from the light source device 2, namely the illumination light axis Ax. The first multi-lens 41 divides the light entering the first multi-lens 41 from the light source device 2 into a plurality of partial light beams with the plurality of lenses 411.

Figure 14:
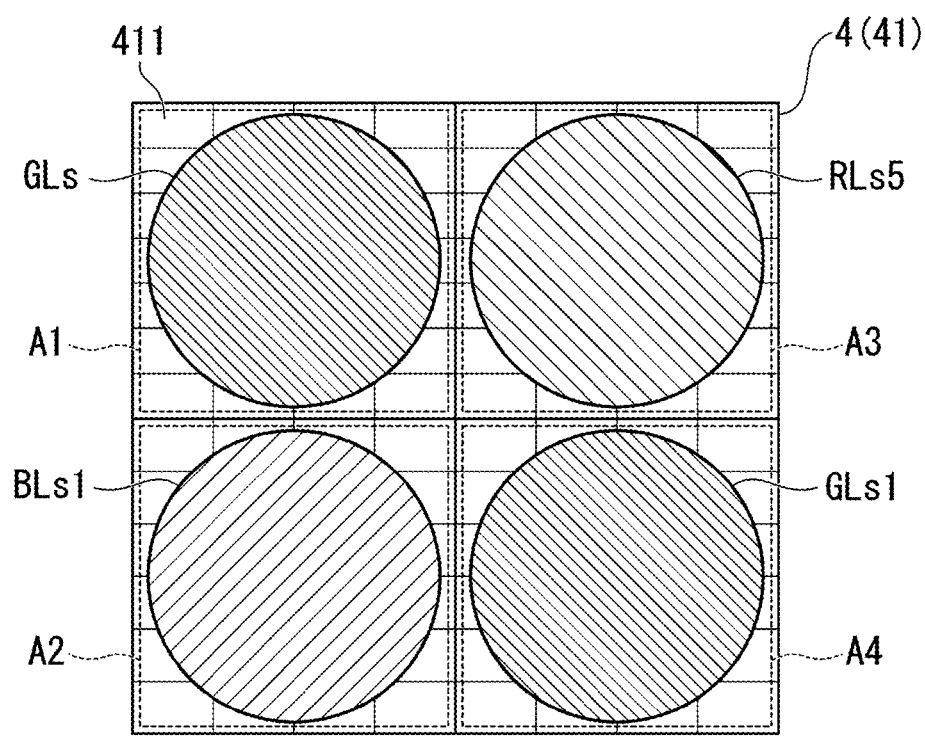
FIG. 14 is a schematic diagram showing positions of incidence of colored light beams in a first multi-lens.

FIG. 14 is a schematic diagram showing positions of incidence of the respective colored light beams in the first multi-lens 41 viewed from the −Z direction.

As shown in FIG. 14, the green light beam GLs, the blue light beam BLs1, the red light beam RLs5, and the green light beam GLs1 emitted from the light source device 2 enter the first multi-lens 41. The green light beam GLs emitted from the position at the −X direction side and at the +Y direction side in the light source device 2 enters the plurality of lenses 411 included in an area A1 located at the −X direction side and at the +Y direction side in the first multi-lens 41. Further, the blue light beam BLs1 emitted from the position at the −X direction side and at the −Y direction side in the light source device 2 enters a plurality of lenses 411 included in an area A2 located at the −X direction side and at the −Y direction side in the first multi-lens 41.

The red light beam RLs5 emitted from the position at the +X direction side and at the +Y direction side in the light source device 2 enters a plurality of lenses 411 included in an area A3 located at the +X direction side and at the +Y direction side in the first multi-lens 41. The green light beam GLs1 emitted from the position at the +X direction side and at the −Y direction side in the light source device 2 enters a plurality of lenses 411 included in an area A4 located at the +X direction side and at the −Y direction side in the first multi-lens 41. Each of the colored light beams having entered the lenses 411 turns to a plurality of partial light beams, and enters lenses 421 corresponding respectively to the lenses 411 in the second multi-lens 42. Out of the light L emitted from the light source device 2 according to the present embodiment, the green light beam GLs corresponds to a fifth light beam in the appended claims, the blue light beam BLs1 corresponds to a sixth light beam in the appended claims, the red light beam RLs5 corresponds to a seventh light beam in the appended claims, and the green light beam GLs1 corresponds to an eighth light beam in the appended claims.

As shown in FIG. 1, the second multi-lens 42 has the plurality of lenses 421 which is arranged in a matrix in a plane perpendicular to the illumination light axis Ax, and at the same time, corresponds respectively to the plurality of lenses 411 of the first multi-lens 41. The plurality of partial light beams emitted from the lenses 411 corresponding respectively to the lenses 421 enters the respective lenses 421. Each of the lenses 421 makes the partial light beam having entered the lens 421 enter the superimposing lens 43.

The superimposing lens 43 superimposes the plurality of partial light beams entering the superimposing lens 43 from the second multi-lens 42 on each other in the image formation area of the light modulation device 6. In particular, the second multi-lens 42 and the superimposing lens 43 make the green light beam GLs, the blue light beam BLs1, the red light beam RLs5, and the green light beam GLs1 each divided into the plurality of partial light beams enter a plurality of microlenses 621 constituting a microlens array 62 described later of the light modulation device 6 at respective angles different from each other via the field lens 5.

Configuration of Light Modulation Device

As shown in FIG. 1, the light modulation device 6 modulates the light emitted from the light source device 2. In particular, the light modulation device 6 modulates each of the colored light beams which are emitted from the light source device 2, and then enter the light modulation device 6 via the homogenization device 4 and the field lens 5 in accordance with image information to form the image light corresponding to the image information. The light modulation device 6 is provided with the single liquid crystal panel 61 and the single microlens array 62.

Configuration of Liquid Crystal Panel

Figure 15:
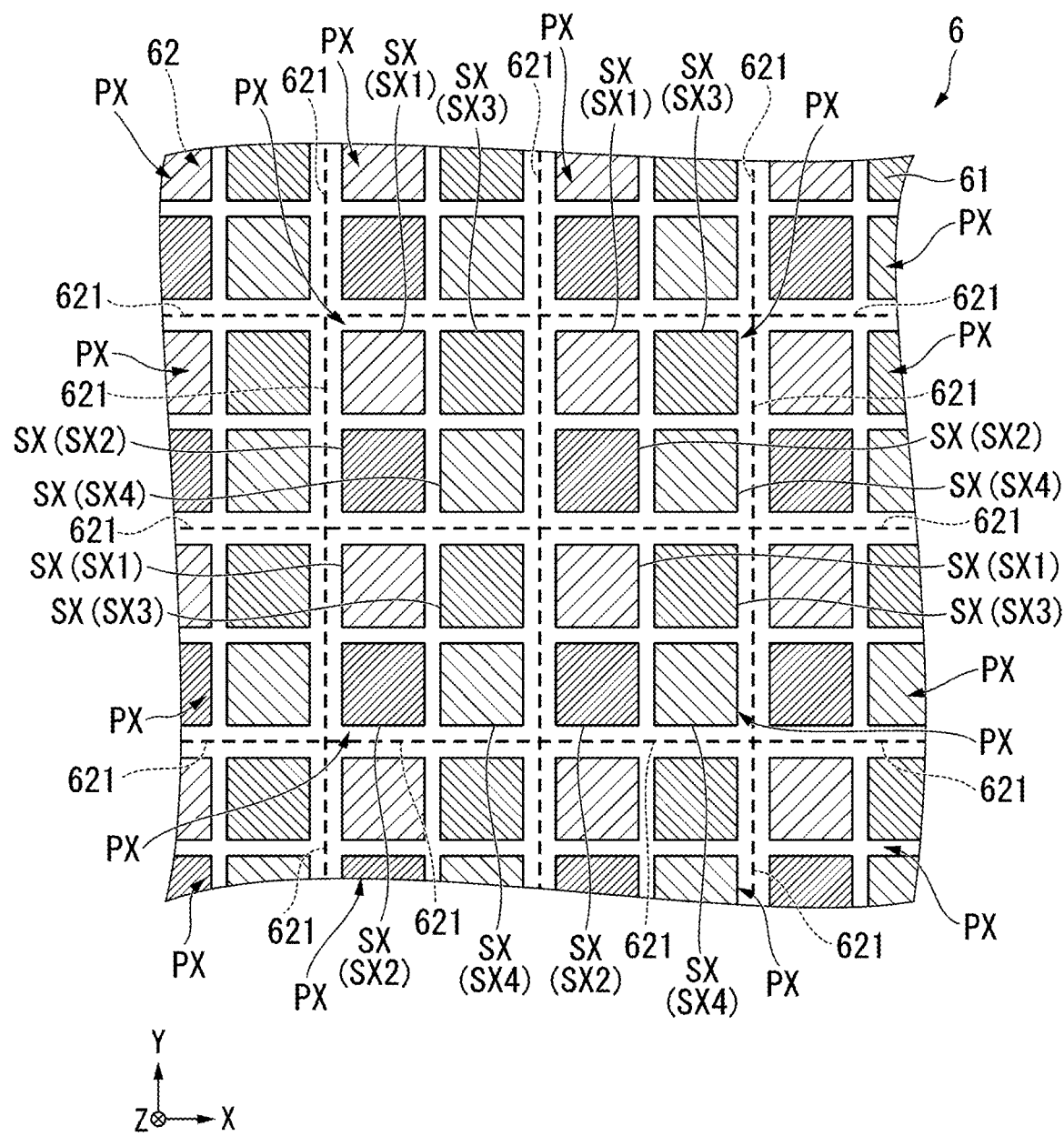
FIG. 15 is an enlarged view of a light modulation device.

FIG. 15 is a schematic enlarged view of a part of the light modulation device 6 viewed from the −Z direction. In other words, FIG. 15 shows a correspondence relationship between the pixels PX provided to the liquid crystal panel 61 and the microlenses 621 provided to the microlens array 62.

As shown in FIG. 15, the liquid crystal panel 61 has the plurality of pixels PX arranged in a matrix in a plane perpendicular to the illumination light axis Ax.

Each of the pixels PX has a plurality of sub-pixels SX for respectively modulating colored light beams different in color from each other. In the present embodiment, each of the pixels PX has four sub-pixels SX (SX1 through SX4). Specifically, in one pixel PX, the first sub-pixel SX1 is disposed at a position at the −X direction side and at the +Y direction side. The second sub-pixel SX2 is disposed at a position at the −X direction side and at the −Y direction side. The third sub-pixel SX3 is disposed at a position at the +X direction side and at the +Y direction side. The fourth sub-pixel SX4 is disposed at a position at the +X direction side and at the −Y direction side.

Configuration of Microlens Array

As shown in FIG. 1, the microlens array 62 is disposed at the −Z direction side as the side of incidence of light with respect to the liquid crystal panel 61. The microlens array 62 guides the colored light beams entering the microlens array 62 to the individual pixels PX. The microlens array 62 has the plurality of microlenses 621 corresponding to the plurality of pixels PX.

As shown in FIG. 15, the plurality of microlenses 621 is arranged in a matrix in a plane perpendicular to the illumination light axis Ax. In other words, the plurality of microlenses 621 is arranged in a matrix in an orthogonal plane with respect to the central axis of the light entering the plurality of microlenses 621 from the field lens 5. In the present embodiment, one microlens 621 is disposed so as to correspond to the two sub-pixels arranged in the +X direction and the two sub-pixels arranged in the +Y direction. In other words, one microlens 621 is disposed so as to correspond to the four sub-pixels SX1 through SX4 arranged 2x2 in the X-Y plane.

The green light beam GLs, the blue light beam BLs1, the red light beam RLs5, and the green light beam GLs1 superimposed by the homogenization device 4 enter the microlenses 621 at respective angles different from each other. The microlenses 621 make the colored light beams entering the microlens 621 enter the sub-pixels SX corresponding to the colored light beams. Specifically, the microlens 621 makes the green light beam GLs enter the first sub-pixel SX1 out of the sub-pixels SX of the pixel PX corresponding to the microlens 621, makes the blue light beam BLs1 enter the second sub-pixel SX2, makes the red light beam RLs5 enter the third sub-pixel SX3, and makes the green light beam GLs1 enter the fourth sub-pixel SX4. Thus, the colored light beams corresponding respectively to the sub-pixels SX1 through SX4 enter the respective sub-pixels SX1 through SX4, and the colored light beams are respectively modulated by the corresponding sub-pixels SX1 through SX4. In such a manner, the image light modulated by the liquid crystal panel 61 is projected by the projection optical device 7 on the projection target surface not shown.

Advantages of First Embodiment

In the related-art projector described in Document 1, the lamp is used as the light source. Since the light emitted from the lamp is not uniform in polarization direction, in order to use the liquid crystal panel as the light modulation device, a polarization conversion device for uniforming the polarization direction becomes necessary. For the projector, there is generally used the polarization conversion device provided with a multi-lens array and a polarization split element (PBS) array. However, in order to reduce the size of the projector, there are required the multi-lens array and the PBS array narrow in pitch, but it is extremely difficult to form the PBS array narrow in pitch.

To cope with this problem, in the present embodiment, the four colors of colored light beams uniform in the polarization direction, namely the green light beam GLs as the S-polarization component, the blue light beam BLs1 as the S-polarization component, the red light beam RLs5 as the S-polarization component, and the green light beam GLs1 as the S-polarization component, are emitted from the light source device 2. According to this configuration, it is possible to realize the light source device 2 capable of emitting the plurality of colored light beams spatially separated from each other and uniformed in the polarization direction without using the polarization conversion element narrow in pitch described above. Thus, it becomes possible to reduce the light source device 2 in size, and by extension, it is possible to achieve reduction in size of the projector 1.

Further, in the projector 1 according to the present embodiment, since the green light beams enter the two sub-pixels SX1, SX4 out of the four sub-pixels SX in the light modulation device 6, it is possible to increase the light intensity of the green light entering the pixel PX. Thus, it is possible to increase the luminosity factor of the projection image.

Further, in the light source device 2 according to the present embodiment, there are provided the light source section 21 for emitting the first light beam BL having the blue wavelength band and including the blue light beam BLp as the P-polarization component and the blue light beam BLs as the S-polarization component, the first optical member 22 which transmits the blue light beam BLp entering the first optical member 22 along the +X direction from the light source section 21 toward the +X direction, and reflects the blue light beam BLs toward the −Z direction, the second optical member 23 which is disposed at the +X direction side of the first optical member 22, and reflects the blue light beam BLp entering the second optical member 23 along the +X direction from the first optical member 22 toward the −Z direction, the diffusion plate 261 which is disposed at the −Z direction side of the first optical member 22, diffuses the blue light beam BLp entering the diffusion plate 261 along the −Z direction from the first optical member 22, and emits the result toward the +Z direction, the wavelength conversion element 28 which is disposed at the −Z direction side of the second optical member 23, performs the wavelength conversion on a part of the blue light beam BLp entering the wavelength conversion element 28 along the −Z direction from the second optical member 23 to emit the yellow light beam YL toward the +Z direction, and the optical element 31 which is disposed between the first optical member 22 and the second optical member 23, and has the flat-surface area 31A and the concave-surface area 31B. The yellow light beam YL enters the second optical member 23 along the +Z direction from the wavelength conversion element 28, the second optical member 23 transmits the yellow light beam YLp toward the +Z direction, and reflects the yellow light beam YLs toward the −X direction. The optical element 31 separates the yellow light beam YLs which enters the optical element 31 along the −X direction from the second optical member 23 into the green light beam GLs and the red light beam RLs, transmits the green light beam GLs toward the −X direction, and reflects the red light beam RLs toward the +X direction. The first optical member 22 transmits the blue light beam BLc2 which is emitted from the diffusion plate 261 along the +Z direction, and reflects the green light beam GLs which enters the first optical member 22 along the −X direction from the second optical member 23 toward the +Z direction.

According to the light source device 2 related to the present embodiment, by making the red light beam RLs separated from the yellow light beam YLs in the optical element 31 enter the wavelength conversion element 28, it is possible to emit the red light beam RLm as the unpolarized light from the wavelength conversion element 28 together with the yellow light beam YL. Similarly to the yellow light beam YLp, the red light beam RLp1 as the P-polarization component which is a part of the red light beam RLm as the unpolarized light is emitted toward the +Z direction from the second optical member 23.

In the case of the present embodiment, it is possible to take out the red light beam RLp1 as a part of the red light beam RLs5. In other words, since it is possible to reuse a part of the red component separated from the yellow light beam YL in the optical element 31 as the red light beam RLs5, it is possible to increase the light use efficiency of the red component.

Further, it is possible for the optical element 31 in the present embodiment to return the peripheral light beam Y2 of the yellow light beam YLs which enters the optical element 31 as the diverging light toward the wavelength conversion element 28 as parallel light using the concave-surface area 31B. Thus, the red light beam RLs separated from the yellow light beam YLs efficiently enters the wavelength conversion element 28, and therefore, it is possible to further increase the light use efficiency of the red component.

Therefore, according to the light source device 2 related to the present embodiment, it is possible to improve the color reproducibility of the red component of the projection image.

Further, in the light source device 2 according to the present embodiment, the second optical member 23 is provided with the configuration in which the red light beam RLs reflected by the optical element 31 to enter the second optical member 23 along the +X direction is reflected by the second optical member 23 toward the −Z direction to enter the wavelength conversion element 28.

According to this configuration, it is possible to surely make the red light beam RLs separated from the yellow light beam YLs in the optical element 31 enter the wavelength conversion element 28. Thus, it is possible to increase the light use efficiency of the red light beam.

Further, in the light source device 2 according to the present embodiment, the second optical member 23 has the configuration of transmitting the red light beam RLp1 toward the +Z direction and reflecting the red light beam RLs1 toward the optical element 31 out of the red light beam RLm emitted from the wavelength conversion element 28.

According to this configuration, the red light beam RLp1 as the P-polarization component separated from the red light beam RLm can be taken out as the red light beam RLs5. Thus, by increasing the light intensity of the red light beam RLs5, it is possible to improve the color reproducibility of the projection image.

Further, in the light source device 2 according to the present embodiment, there is adopted the configuration further provided with the first retardation element 37 which is disposed between the first optical member 22 and the diffusion device 26, and which the blue light beam BLp enters along the −Z direction from the first optical member 22.

According to this configuration, since the first retardation element 37 is disposed between the first optical member 22 and the diffusion device 26, it is possible to convert the blue light beam BLc2 as the circularly polarized light emitted from the diffusion device 26 into the blue light beam BLp as the P-polarization component to be transmitted through the first optical member 22. Thus, it is possible to increase the use efficiency of the blue light beam BLc2 emitted from the diffusion device 26.

Further, in the light source device 2 according to the present embodiment, the light source section 21 is provided with the configuration including the light emitting elements 211, and the second retardation element 2131 which the light emitted from the light emitting elements 211 enters, and which emits the first light beam BL.

According to this configuration, since the light source section 21 is provided with the second retardation element 2131, it is possible to surely make the blue light beam BLp as the P-polarization component and the blue light beam BLs as the S-polarization component enter the first optical member 22. Further, according to this configuration, since the polarization directions of the light beams emitted from the plurality of light emitting elements 211 are allowed to be the same, it is sufficient to dispose the same solid-state light sources in the same orientation, and thus, it is possible to simplify the configuration of the light source section 21.

Further, in the light source device 2 according to the present embodiment, there is adopted the configuration in which the second retardation element 2131 can rotate centering on the rotational axis R2 extending along the proceeding direction of the light entering the second retardation element 2131.

According to this configuration, since the second retardation element 2131 is made capable of rotating around the rotational axis R2 extending along the +X direction, by adjusting the rotational angle of the second retardation element 2131, it is possible to adjust the ratio in light intensity between the blue light beam BLs and the blue light beam BLp which enter the first optical member 22. Thus, it is possible to adjust the light intensity ratio between the green light beam GLs, the blue light beam BLs1, the red light beam RLs5, and the green light beam GLs1 emitted from the light source device 2, and therefore, it is possible to adjust the white balance of the light source device 2.

Further, in the light source device 2 according to the present embodiment, there is adopted the configuration further provided with the third retardation element 35 which is disposed between the second optical member 23 and the wavelength conversion element 28, and provides the red light beam RLs with the phase difference as much as ¼ of the red wavelength band.

According to this configuration, since the third retardation element 35 is disposed between the second optical member 23 and the wavelength conversion element 28, it is possible to convert the red light beam RLc2 as the circularly polarized light emitted from the wavelength conversion element 28 into the red light beam RLp3 as the P-polarization component, and transmit the result through the second optical member 23 to be emitted to the outside as the red light beam RLs5. Thus, it is possible to increase the use efficiency of the red light beam RLs5 emitted from the wavelength conversion element 28.

Further, in the light source device 2 according to the present embodiment, there is adopted the configuration further provided with the first mirror 141, the second mirror 142, and the third mirror 143, wherein the first mirror 141 is disposed at the +Y direction side of the first optical member 22 and the second optical member 23, the second mirror 142 is disposed so as to be opposed to the first mirror 141, and is disposed at the −Y direction side of the first optical member 22 and the second optical member 23, and the third mirror 143 is disposed so as to cross the first optical member 22 and the second optical member 23 to couple the end part 141*a* at the +X direction side of the first mirror 141 and the end part 142*a* at the +X direction side of the second mirror 142 to each other.

As described above, although the blue light beam BLc2 emitted from the diffusion device 26 is substantially collimated by the first light collection element 25, some components thereof enter the first optical member 22 in a diverging state. Similarly, although the yellow light beam YL emitted from the wavelength conversion element 28 is substantially collimated by the second light collection element 27, some components thereof enter the second optical member 23 in a diverging state.

In contrast, in the case of the present embodiment, since there is provided the light tunnel 40 for holding the both sides of the first optical member 22 and the second optical member 23 in the Y direction, it is possible to take the light spreading in the Y direction in the first optical member 22 or the second optical member 23 by reflecting the light with the first mirror 141 and the second mirror 142. Further, it is possible to take the light spreading in the +X direction in the second optical member 23 by reflecting the light with the third mirror 143.

Thus, it is possible to efficiently take in the light which is emitted to the first optical member 22 of the plate type and the second optical member 23 of the plate type from the diffusion device 26 and the wavelength conversion element 28.

Further, in the light source device 2 according to the present embodiment, there is adopted the configuration in which the flat-surface area 31A of the optical element 31 is located in the central part P1 and the concave-surface area 31B of the optical element 31 is located in the peripheral part P2, wherein the central light beam Y1 includes the principal ray Ax2 of the yellow light beam YLs entering the flat-surface area 31A from the second optical member 23, and enters the central part P1, and the peripheral part P2 is located on the periphery of the central part P1.

According to this configuration, it is possible to make the central light beam Y1 entering the optical element 31 as the parallel light enter the flat-surface area 31A of the optical element 31, and to make the peripheral light beam Y2 entering the optical element 31 as the diverging light enter the concave-surface area 31B of the optical element 31. Thus, the red light beam RL2 separated from the peripheral light beam Y2 is made to enter the second light collection element 27 as the parallel light, and is converged on the wavelength conversion element 28. Therefore, it is possible to make the red light beam RL2 separated from the peripheral light beam Y2 efficiently enter the wavelength conversion element 28.

Further, in the light source device 2 according to the present embodiment, there is adopted the configuration in which the optical element 31 has the plane of incidence of light 131 opposed to the second optical member 23 and the light exit surface 132 opposed to the first optical member 22, and the concave-surface area 31B includes the aspherical shape provided to at least the plane of incidence of light 131 of the optical element 31.

According to this configuration, by reflecting the peripheral light beam Y2 which enters the plane of incidence of light 131 as the diverging light out of the yellow light beam YLs with the concave-surface area 31B which is disposed on the plane of incidence of light 131 and includes the aspherical shape so as to come closer to the optical axis 31C of the optical element 31, it is possible to return the peripheral light beam Y2 toward the wavelength conversion element 28 as the parallel light.

Further, in the light source device 2 according to the present embodiment, there is adopted the configuration in which the blue light beam BLp is transmitted through the optical element 31 from the light exit surface 132 toward the plane of incidence of light 131, the green light beam GLs is transmitted through the optical element 31 from the plane of incidence of light 131 toward the light exit surface 132, and the plane of incidence of light 131 and the light exit surface 132 has the angle correction function of correcting the angle change generated in the blue light beam BLp or the green light beam GLs when entering the optical element 31 and then emitting the blue light beam BLp or the green light beam GLs corrected in the angle change.

According to this configuration, since it is difficult for the angle change to occur between before and after the blue light beam BLp or the green light beam GLs is transmitted through the optical element 31, it is possible to prevent an occurrence of the problem of a decrease in light intensity of the yellow light beam YL and the problem of a decrease in light use efficiency of the green light beam GLs.

Further, in the light source device 2 according to the present embodiment, there is adopted the configuration further provided with the first color separation element 29 which is disposed at the +Z direction side of the first optical member 22, and separates the light emitted from the first optical member 22 into the green light beam GLp and the blue light beam BLp, and the second color separation element 33 which is disposed at the +Z direction side of the second optical member 23, and separates the light emitted from the second optical member 23 into the red light beam RLs5 and the green light beam GLs1.

According to this configuration, it is possible to emit the green light beam GLs, the blue light beam BLs1, the red light beam RLs5, and the green light beam GLs1 from the light source device 2.

Further, in the case of the present embodiment, since the fifth retardation element 38 is disposed on the light path of the blue light beam BLp emitted from the reflecting prism 292, it is possible to convert the blue light beam BLp into the blue light beam BLs1 as the S-polarization component. Thus, it is possible to make each of the green light beam GLs and the blue light beam BLs1 emitted from the first color separation element 29 turn to the light as the S-polarization component.

Further, in the case of the present embodiment, since the fourth retardation element 36 is disposed between the second optical member 23 and the second color separation element 33, it is possible to convert the yellow light beam YLp, the red light beam RLp1, and the red light beam RLp3 into the yellow light beam YLs, the red light beam RLs2, and the red light beam RLs3 as the S-polarization component. Thus, it is possible to make each of the red light beam RLs5 and the green light beam GLs1 emitted from the second color separation element 33 turn to the light as the S-polarization component.

Therefore, it is possible to make all of the green light beam GLs, the blue light beam BLs1, the red light beam RLs5, and the green light beam GLs1 emitted from the light source device 2 uniform in polarization component, namely the light beams as the S-polarization component.

Further, in the case of the present embodiment, since the light source device 2 is provided with the first light collection element 25 for converging the blue light beam BLs toward the diffusion device 26, it is possible to efficiently converge the blue light beam BLc1 emitted from the third retardation element 35 on the diffusion device 26 with the first light collection element 25, and at the same time, it is possible to substantially collimate the blue light beam BLc2 emitted from the diffusion device 26. Thus, it is possible to suppress the loss of the blue light beam BLs to increase the use efficiency of the blue light beam BLs.

Further, in the case of the present embodiment, since the light source device 2 is provided with the second light collection element 27 for converging the blue light beam BLp toward the wavelength conversion element 28, it is possible to efficiently converge the blue light beam BLp on the wavelength conversion element 28 with the second light collection element 27, and at the same time, it is possible to substantially collimate the yellow light beam YL emitted from the wavelength conversion element 28. Thus, it is possible to suppress the loss of the yellow light beam YL to increase the use efficiency of the yellow light beam YL.

Further, in the case of the present embodiment, since the projector 1 is provided with the homogenization device 4 located between the light source device 2 and the light modulation device 6, it is possible to substantially homogenously irradiate the light modulation device 6 with the green light beam GLs, the blue light beam BLs1, the red light beam RLs5, and the green light beam GLs1 emitted from the light source device 2. Thus, it is possible to suppress the color unevenness and the luminance unevenness in the projection image.

Further, in the case of the present embodiment, since the light modulation device 6 is provided with the microlens array 62 having the plurality of microlenses 621 corresponding to the plurality of pixels PX, it is possible to make the four colored light beams entering the light modulation device 6 enter the corresponding four sub-pixels SX of the liquid crystal panel 61 using the microlenses 621. Thus, it is possible to make the colored light beams emitted from the light source device 2 efficiently enter the respective sub-pixels SX, and thus, it is possible to increase the use efficiency of the colored light beams.

Second Embodiment

A second embodiment of the present disclosure will hereinafter be described using FIG. 16 and FIG. 17.

A light source device according to the second embodiment is substantially the same in basic configuration as that of the first embodiment, but is different in configuration of the optical element from that of the first embodiment. Therefore, hereinafter, only the configuration of the optical element is described, and the description of the rest of the configurations will be omitted.

Figure 16:
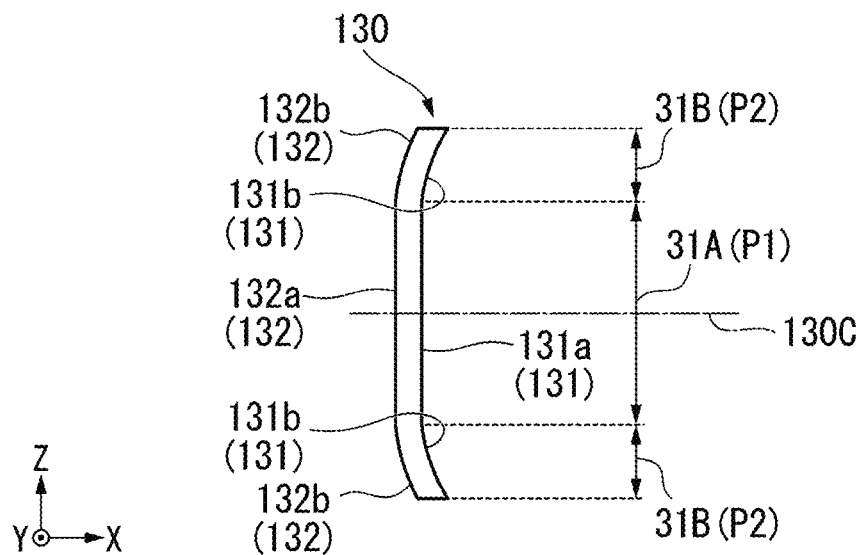
FIG. 16 is a cross-sectional view showing a configuration of an optical element in a second embodiment.

FIG. 16 is a cross-sectional view showing the configuration of the optical element 130 in the present embodiment. FIG. 16 is a cross-sectional view of the optical element 130 along a plane parallel to the X-Z plane.

As shown in FIG. 16, in the optical element 130 in the present embodiment, the incident side concave surface 131b and the exit side concave surface 132b constituting the concave-surface area 31B each have a spherical shape. The optical element 130 in the present embodiment adopts a structure in which the flat-surface area 31A formed of the flat-surface shape and the concave-surface area 31B formed of the spherical shape are combined with each other, and can therefore easily be manufactured compared to the optical element 31 in the first embodiment adopting the structure in which the flat-surface area 31A formed of the flat-surface shape and the concave-surface area 31B formed of the aspherical shape are combined with each other. Therefore, according to the light source device related to the present embodiment, it is possible to achieve the reduction in cost by adopting the optical element 130.

Also in the optical element 130 in the present embodiment, the plane of incidence of light 131 and the light exit surface 132 have the angle correction function of correcting the angle change caused in the blue light beam BLp or the green light beam GLs when entering the optical element 130, and then emitting the blue light beam BLp or the green light beam GLs corrected in the angle change. Thus, it is possible to prevent an occurrence of the problem of a decrease in light intensity of the yellow light beam YL and the problem of a decrease in light use efficiency of the green light beam GLs caused by the transmission of the blue light beam BLp or the green light beam GLs through the optical element 130.

Figure 17:
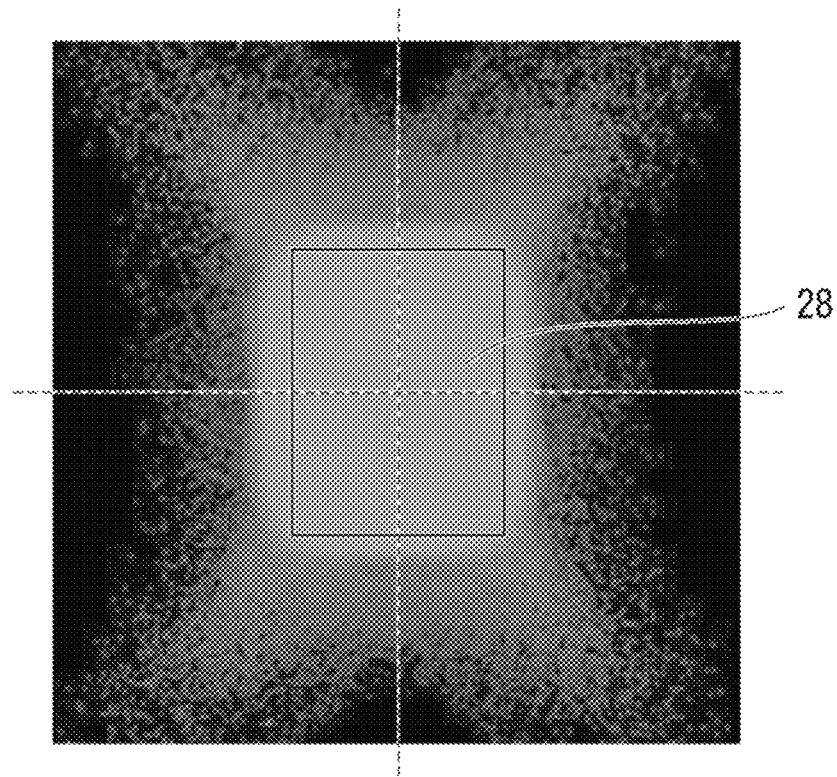
FIG. 17 is a diagram showing a simulation result in the second embodiment.

FIG. 17 is a diagram showing a simulation result of the red light beam which enters the wavelength conversion element 28 in the present embodiment.

As shown in FIG. 17, according to the optical element 130 in the present embodiment, it has been confirmed that the red light beam thus separated is made to efficiently enter the surface of the wavelength conversion element 28 compared to the configuration in the comparative example shown in FIG. 6. Specifically, it has been confirmed that the light intensity of the red light beam entering the wavelength conversion element 28 increases by about 10% in the simulation result shown in FIG. 17 compared to the simulation result shown in FIG. 6.

Advantages of Second Embodiment

According to the optical element 130 in the present embodiment, by forming the concave-surface area 31B with the spherical shape instead of the aspherical shape, it is possible to make the red light beam efficiently enter the wavelength conversion element 28 while suppressing the increase in cost.

Further, also in the present embodiment, it is possible to obtain substantially the same advantages as in the first embodiment such as the advantage that it is possible to realize the light source device capable of emitting the plurality of colored light beams made uniform in polarization direction without using the polarization conversion element narrow in pitch, and the advantage that it is possible to achieve the reduction in size of the light source device and the projector.

It should be noted that the scope of the present disclosure is not limited to the embodiments described above, but a variety of modifications can be provided thereto within the scope or the spirit of the present disclosure.

For example, although there is cited as an example when both of the incident side flat surface 131a and the exit side flat surface 132a in the flat-surface area 31A are formed of a flat surface in the optical elements 31, 130 in the embodiments described above, it is sufficient for the flat-surface area 31A to have at least the incident side flat surface 131a. In other words, it is possible for the exit side flat surface 132a to be formed of a curved surface such as a concave surface or convex surface. Further, in the optical element 31 in the embodiment described above, there is cited as an example when both of the incident side concave surface 131b and the exit side concave surface 132b of the concave-surface area 31B are formed of the aspherical shape or a concave shape, but it is sufficient for the aspherical shape or the concave shape constituting the concave-surface area 31B to be provided to at least the incident side concave surface 131b. In other words, in the concave-surface area 31B, the exit side concave surface 132b can be formed of a flat surface.

Further, in the optical element 31 in the embodiment described above, it is possible for each of the incident side concave surface 131b and the exit side concave surface 132b constituting the concave-surface area 31B to be formed of a free-form surface. According to this configuration, since it is possible to more efficiently return the red light beam RLs toward the wavelength conversion element 28, it is possible to increase the use efficiency of the red light beam RLs.

Further, although there is cited when forming both of the first optical member 22 and the second optical member 23 of the plate type polarization split element as an example in the embodiments described above, the first optical member 22 and the second optical member 23 can be formed of a prism type polarization split element in which two members each shaped like a substantially isosceles right triangular prism are combined with each other to form a substantially rectangular solid shape provided with an optical film formed on the interface between the two members. When using the prism type polarization split element as the first optical member 22 and the second optical member 23, the light tunnel 40 becomes unnecessary. Further, it is possible to form one of the first optical member 22 and the second optical member 23 using the prism type, and form the other using the plate type.

Further, in the embodiments described above, the first optical layer 221 and the second optical layer 222 are disposed on two surfaces of a single light transmissive substrate. Instead of this configuration, it is possible for the first optical layer 221 and the second optical layer 222 to be provided to respective light transmissive substrates different from each other. For example, it is possible to adopt a configuration in which the first optical layer 221 is disposed on a first surface of a first light transmissive substrate, an antireflection layer is disposed on a second surface different from the first surface of the first light transmissive substrate, the second optical layer 222 is disposed on a third surface of a second light transmissive substrate, an antireflection layer is disposed on a fourth surface different from the third surface of the second light transmissive substrate, and the first optical layer 221 and the second optical layer 222 are disposed so as to be opposed to each other. Similarly, the third optical layer 231 and the fourth optical layer 232 can be provided to respective light transmissive substrates different from each other.

The light source devices 2 according to the embodiments described above are each provided with the first light collection element 25 and the second light collection element 27. However, this configuration is not a limitation, and at least one of the first light collection element 25 and the second light collection element 27 is not required to be disposed.

The light source section 21 in each of the embodiments described above emits the blue light beams BLs, BLp toward the +X direction. However, this is not a limitation, and it is also possible to adopt a configuration in which the light source section 21 emits the blue light beams BLs, BLp in a direction crossing the +X direction, and the blue light beams BLs, BLp are reflected using, for example, a reflecting member, and are then made to enter the first optical member 22 in the +X direction.

The projector 1 according to each of the embodiments described above is provided with the homogenization device 4 having the first multi-lens 41, the second multi-lens 42, and the superimposing lens 43. It is possible to dispose a homogenization device having other configurations instead of this configuration, or it is not required to dispose the homogenization device 4.

The light source device 2 according to the embodiments described above emits the colored light beams from the four exit positions, respectively, and the liquid crystal panel 61 constituting the light modulation device 6 has the four sub-pixels SX in each of the pixels PX. Instead of this configuration, it is possible to adopt a configuration in which the light source device 2 emits three colored light beams, and the liquid crystal panel has three sub-pixels in each pixel. In this case, for example, in the light source devices according to the embodiments described above, a total reflection member can be disposed in the light path of the green light beam GLs.

The light source device 2 according to the embodiments described above emits the green light beam GLs, the blue light beam BLs1, the red light beam RLs5, and the green light beam GLs1 which are each S-polarized light, and are spatially separated from each other. Instead of these configurations, the polarization state of the colored light beams emitted by the light source device can be another polarization state. For example, it is possible for the light source device to have a configuration of emitting a plurality of colored light beams which are each P-polarized light, and are spatially separated from each other.

Besides the above, the specific descriptions of the shape, the number, the arrangement, the material, and so on of the constituents of the light source device and the projector are not limited to those of the embodiments described above, but can arbitrarily be modified. Further, although in the embodiments described above, there is described the example of installing the light source device according to the present disclosure in the projector, the example is not a limitation. The light source device according to an aspect of the present disclosure can also be applied to lighting equipment, a headlight of a vehicle, and so on.

A light source device according to an aspect of the present disclosure may have the following configuration.

The light source device according to the aspect of the present disclosure includes a light source section configured to emit a first light beam which has a first wavelength band and includes light polarized in a first polarization direction and light polarized in a second polarization direction different from the first polarization direction, a first polarization split element which is configured to transmit the first light beam entering the first polarization split element from the light source section along a first direction and polarized in the first polarization direction toward the first direction, and reflect the first light beam polarized in the second polarization direction toward a second direction crossing the first direction, a second polarization split element disposed at the first direction side of the first polarization split element, and configured to reflect the first light beam which enters the second polarization split element along the first direction from the first polarization split element, and is polarized in the first polarization direction toward the second direction, a diffusion element disposed at the second direction side of the first polarization split element, and configured to diffuse the first light beam which enters the diffusion element along the second direction from the first polarization split element, and which is polarized in the second polarization direction, and configured to emit the first light beam diffused toward a third direction as an opposite direction to the second direction, a wavelength conversion element disposed at the second direction side of the second polarization split element, configured to perform wavelength conversion on the first light beam which enters the wavelength conversion element along the second direction from the second polarization split element, and is polarized in the first polarization direction, and configured to emit a second light beam having a second wavelength band different from the first wavelength band toward the third direction, and an optical element disposed between the first polarization split element and the second polarization split element, and having a flat-surface area and a concave-surface area, wherein the second light beam enters the second polarization split element along the third direction from the wavelength conversion element, the second polarization split element transmits the second light beam polarized in the first polarization direction toward the third direction, and reflects the second light beam polarized in the second polarization direction toward a fourth direction as an opposite direction to the first direction, the optical element separates the second light beam which enters the optical element along the fourth direction from the second polarization split element and is polarized in the second polarization direction into a third light beam having a third wavelength band different from the second wavelength band, and a fourth light beam having a fourth wavelength band different from the second wavelength band and the third wavelength band to transmit the third light beam toward the fourth direction and reflect the fourth light beam toward the first direction, and the first polarization split element transmits the first light beam which is emitted along the third direction from the diffusion element, and reflects the third light beam which enters the first polarization split element along the fourth direction from the second polarization split element toward the third direction.

In the light source device according to the aspect of the present disclosure, there may be adopted a configuration in which the second polarization split element reflects the fourth light beam which is reflected by the optical element to enter the second polarization split element along the first direction to enter the wavelength conversion element.

In the light source device according to the aspect of the present disclosure, there may be adopted a configuration in which the second polarization split element transmits light polarized in the first polarization direction toward the third direction and reflects light polarized in the second polarization direction toward the optical element out of the fourth light beam emitted from the wavelength conversion element.

In the light source device according to the aspect of the present disclosure, there may be adopted a configuration further including a first retardation element which is disposed between the first polarization split element and the diffusion element, and which the first light beam polarized in the second polarization direction enters along the second direction from the first polarization split element.

In the light source device according to the aspect of the present disclosure, there may be adopted a configuration in which the light source section includes a light emitting element configured to emit light in the first wavelength band, and a second retardation element which the light emitted from the light emitting element enters, and which is configured to emit the first light beam.

In the light source device according to the aspect of the present disclosure, there may be adopted a configuration in which the second retardation element is made rotatable around a rotational axis along a proceeding direction of light entering the second retardation element.

In the light source device according to the aspect of the present disclosure, there may be adopted a configuration further including a third retardation element which is disposed between the second polarization split element and the wavelength conversion element, and is configured to provide a phase difference as much as ¼ of the fourth wavelength band to the fourth light beam.

In the light source device according to the aspect of the present disclosure, there may be adopted a configuration further including a first mirror disposed at a fifth direction side of the first polarization split element and the second polarization split element, the fifth direction crossing the first direction, the second direction, the third direction, and the fourth direction, a second mirror disposed so as to be opposed to the first mirror, and disposed at a sixth direction side of the first polarization split element and the second polarization split element, the sixth direction being an opposite direction to the fifth direction, and a third mirror which is disposed so as to cross the first polarization split element and the second polarization split element, and couples an end part in the first direction of the first mirror and an end part in the first direction of the second mirror to each other.

In the light source device according to the aspect of the present disclosure, there may be adopted a configuration in which a flat-surface area of the optical element is located in a central part where a light beam including a principal ray of the second light beam, which is polarized in the second polarization direction, and enters the optical element from the second polarization split element, enters, and a concave-surface area of the optical element is located in a peripheral part disposed on a periphery of the central part.

In the light source device according to the aspect of the present disclosure, there may be adopted a configuration in which the optical element has a first surface opposed to the second polarization split element and a second surface opposed to the first polarization split element, and the concave-surface area includes a spherical shape or an aspherical shape disposed on at least the first surface of the optical element.

In the light source device according to the aspect of the present disclosure, there may be adopted a configuration in which the first light beam polarized in the first polarization direction is transmitted through the optical element from the second surface toward the first surface, the fourth light beam is transmitted through the optical element from the first surface toward the second surface, and the first surface and the second surface have an angle correction function of correcting an angle change generated in the first light beam or the fourth light beam when entering the optical element to emit the first light beam or the fourth light beam corrected in angle change.

In the light source device according to the aspect of the present disclosure, there may be adopted a configuration further including a first color separation element disposed at the third direction side of the first polarization split element, and configured to separate light emitted from the first polarization split element into a fifth light beam having the third wavelength band and a sixth light beam having the first wavelength band, and a second color separation element disposed at the third direction side of the second polarization split element, and configured to separate light emitted from the second polarization split element into a seventh light beam having the fourth wavelength band and an eighth light beam having the third wavelength band.

A projector according to an aspect of the present disclosure may have the following configuration.

The projector according to the aspect of the present disclosure includes the light source device according to the aspect of the present disclosure, a light modulation device configured to modulate light from the light source device in accordance with image information, and a projection optical device configured to project the light modulated by the light modulation device.

In the projector according to the aspect of the present disclosure, there may be adopted a configuration further including a homogenization device disposed between the light source device and the light modulation device, wherein the homogenization device includes a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

In the projector according to the above aspect of the present disclosure, there may be adopted a configuration in which the light modulation device includes a liquid crystal panel having a plurality of pixels, and a microlens array which is disposed at a light incident side of the liquid crystal panel, and has a plurality of microlenses corresponding to the plurality of pixels, the pixels each include a first sub-pixel, a second sub-pixel, a third sub-pixel, and a fourth sub-pixel, and the microlens makes the fifth light beam enter the first sub-pixel, the sixth light beam enter the second sub-pixel, the seventh light beam enter the third sub-pixel, and the eighth light beam enter the fourth sub-pixel.

What is claimed is:

1. A light source device comprising:
   a light source section configured to emit a first light beam which has a first wavelength band and includes light polarized in a first polarization direction and light polarized in a second polarization direction different from the first polarization direction;
   a first polarization split element which is configured to transmit the first light beam entering the first polarization split element from the light source section along a first direction and polarized in the first polarization direction toward the first direction, and is configured to reflect the first light beam polarized in the second polarization direction toward a second direction crossing the first direction;
   a second polarization split element disposed at the first direction side of the first polarization split element, and configured to reflect the first light beam which enters the second polarization split element along the first direction from the first polarization split element, and is polarized in the first polarization direction toward the second direction;
   a diffusion element disposed at the second direction side of the first polarization split element, and configured to diffuse the first light beam which enters the diffusion element along the second direction from the first polarization split element, and is polarized in the second polarization direction, and configured to emit the first light beam diffused toward a third direction as an opposite direction to the second direction;
   a wavelength conversion element disposed at the second direction side of the second polarization split element, configured to perform wavelength conversion on the first light beam which enters the wavelength conversion element along the second direction from the second polarization split element, and is polarized in the first polarization direction, and configured to emit a second light beam having a second wavelength band different from the first wavelength band toward the third direction; and an optical element disposed between the first polarization split element and the second polarization split element, and having a flat-surface area and a concave-surface area, wherein the second light beam enters the second polarization split element along the third direction from the wavelength conversion element, the second polarization split element transmits the second light beam polarized in the first polarization direction toward the third direction, and reflects the second light beam polarized in the second polarization direction toward a fourth direction as an opposite direction to the first direction, the optical element separates the second light beam which enters the optical element along the fourth direction from the second polarization split element and is polarized in the second polarization direction into a third light beam having a third wavelength band different from the second wavelength band, and a fourth light beam having a fourth wavelength band different from the second wavelength band and the third wavelength band to transmit the third light beam toward the fourth direction and reflect the fourth light beam toward the first direction, and the first polarization split element transmits the first light beam which is emitted along the third direction from the diffusion element, and reflects the third light beam which enters the first polarization split element along the fourth direction from the second polarization split element toward the third direction.

2. The light source device according to claim 1, wherein the second polarization split element reflects the fourth light beam which is reflected by the optical element to enter the second polarization split element along the first direction to enter the wavelength conversion element.

3. The light source device according to claim 2, wherein the second polarization split element transmits light polarized in the first polarization direction toward the third direction and reflects light polarized in the second polarization direction toward the optical element out of the fourth light beam emitted from the wavelength conversion element.

4. The light source device according to claim 1, further comprising:
a first retardation element which is disposed between the first polarization split element and the diffusion element, and which the first light beam polarized in the second polarization direction enters along the second direction from the first polarization split element.

5. The light source device according to claim 1, wherein the light source section includes a light emitting element configured to emit light in the first wavelength band, and a second retardation element which the light emitted from the light emitting element enters, and which is configured to emit the first light beam.

6. The light source device according to claim 5, wherein the second retardation element is made rotatable around a rotational axis along a proceeding direction of light entering the second retardation element.

7. The light source device according to claim 1, further comprising:
a third retardation element which is disposed between the second polarization split element and the wavelength conversion element, and is configured to provide a phase difference as much as ¼ of the fourth wavelength band to the fourth light beam.

8. The light source device according to claim 1, further comprising:
a first mirror disposed at a fifth direction side of the first polarization split element and the second polarization split element, the fifth direction crossing the first direction, the second direction, the third direction, and the fourth direction;
a second mirror disposed so as to be opposed to the first mirror, and disposed at a sixth direction side of the first polarization split element and the second polarization split element, the sixth direction being an opposite direction to the fifth direction; and
a third mirror which is disposed so as to cross the first polarization split element and the second polarization split element, and couples an end part in the first direction of the first mirror and an end part in the first direction of the second mirror to each other.

9. The light source device according to claim 1, wherein
a flat-surface area of the optical element is located in a central part where a light beam including a principal ray of the second light beam, which is polarized in the second polarization direction, and enters the optical element from the second polarization split element, enters, and
a concave-surface area of the optical element is located in a peripheral part disposed on a periphery of the central part.

10. The light source device according to claim 1, wherein
the optical element has a first surface opposed to the second polarization split element and a second surface opposed to the first polarization split element, and
the concave-surface area includes a spherical shape or an aspherical shape disposed on at least the first surface of the optical element.

11. The light source device according to claim 10, wherein
the first light beam polarized in the first polarization direction is transmitted through the optical element from the second surface toward the first surface,
the fourth light beam is transmitted through the optical element from the first surface toward the second surface, and
the first surface and the second surface have an angle correction function of correcting an angle change generated in the first light beam or the fourth light beam when entering the optical element to emit the first light beam or the fourth light beam corrected in angle change.

12. The light source device according to claim 1, further comprising:
a first color separation element disposed at the third direction side of the first polarization split element, and configured to separate light emitted from the first polarization split element into a fifth light beam having the third wavelength band and a sixth light beam having the first wavelength band; and
a second color separation element disposed at the third direction side of the second polarization split element, and configured to separate light emitted from the second polarization split element into a seventh light beam having the fourth wavelength band and an eighth light beam having the third wavelength band.

13. A projector comprising:
the light source device according to claim 12;

a light modulation device configured to modulate light from the light source device in accordance with image information; and a projection optical device configured to project the light modulated by the light modulation device.

14. The projector according to claim 13, further comprising:

a homogenization device disposed between the light source device and the light modulation device, wherein the homogenization device includes a pair of multi-lenses configured to divide the light entering the pair of multi-lenses from the light source device into a plurality of partial light beams, and a superimposing lens configured to superimpose the plurality of partial light beams entering the superimposing lens from the pair of multi-lenses on the light modulation device.

15. The projector according to claim 14, wherein
the light modulation device includes a liquid crystal panel having a plurality of pixels, and a microlens array which is disposed at a light incident side of the liquid crystal panel, and has a plurality of microlenses corresponding to the plurality of pixels,
the pixels each include a first sub-pixel, a second sub-pixel, a third sub-pixel, and a fourth sub-pixel, and
the microlens makes
the fifth light beam enter the first sub-pixel,
the sixth light beam enter the second sub-pixel,
the seventh light beam enter the third sub-pixel, and
the eighth light beam enter the fourth sub-pixel.

* * * * *